(12) United States Patent
Tanaka et al.

(10) Patent No.: US 11,140,357 B2
(45) Date of Patent: Oct. 5, 2021

(54) MULTI-DIRECTION COMMUNICATION APPARATUS AND MULTI-DIRECTION COMMUNICATION METHOD

(71) Applicant: SONY CORPORATION, Tokyo (JP)

(72) Inventors: Yoshizumi Tanaka, Tokyo (JP); Yusuke Sakai, Tokyo (JP); Tetsuhiro Uchida, Tokyo (JP); Katsunari Fukuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/045,591

(22) PCT Filed: Mar. 29, 2019

(86) PCT No.: PCT/JP2019/013934
§ 371 (c)(1),
(2) Date: Oct. 6, 2020

(87) PCT Pub. No.: WO2019/198542
PCT Pub. Date: Oct. 17, 2019

(65) Prior Publication Data
US 2021/0029325 A1    Jan. 28, 2021

(30) Foreign Application Priority Data

Apr. 13, 2018  (JP) .............................. JP2018-077480

(51) Int. Cl.
*H04N 7/15* (2006.01)
*G06F 3/01* (2006.01)
(Continued)

(52) U.S. Cl.
CPC ............... *H04N 7/15* (2013.01); *G06F 3/011* (2013.01); *G06F 3/14* (2013.01); *G06T 19/006* (2013.01)

(58) Field of Classification Search
CPC .... H04N 7/15; H04N 7/14; G06F 3/14; G06F 3/011; G06T 19/006
(Continued)

(56) References Cited

U.S. PATENT DOCUMENTS 5,959,672 A    9/1999  Sasaki
6,535,717 B1 *  3/2003  Matsushima .......... H04H 20/16
                                                  370/316
(Continued)

FOREIGN PATENT DOCUMENTS

JP    09-098428 A    4/1997
JP    2000-078116 A    3/2000
(Continued)

OTHER PUBLICATIONS

International Search Report and Written Opinion of PCT Application No. PCT/JP2019/013934, dated Jun. 25, 2019, 09 pages of ISRWO.

*Primary Examiner* — Melur Ramakrishnaiah
(74) *Attorney, Agent, or Firm* — Chip Law Group

(57) ABSTRACT

The present technique relates to a multi-direction communication apparatus, a multi-direction communication method, and a program capable of reducing an uncomfortable feeling to be provided to a user feeling that spaces are continuous in a multi-direction communication system. A reception section receives real space information including information representing a situation of a real space for a user B. A virtual data generation section generates, on the basis of the received real space information, virtual space information including information representing a situation of a virtual space. A control section controls display, on an information processing apparatus of a user A, of the virtual space represented by the generated virtual space information instead of the real space represented by the real space (Continued)

information. The present technique can be applied to a multi-direction communication system.

10 Claims, 16 Drawing Sheets

(51) Int. Cl.
  *G06F 3/14* (2006.01)
  *G06T 19/00* (2011.01)
(58) Field of Classification Search
  USPC .......................................... 348/14.01–14.16
  See application file for complete search history.

(56) References Cited

U.S. PATENT DOCUMENTS

2002/0101933 A1    8/2002  Ando
2017/0374118 A1*  12/2017  Pevzner .............. H04L 65/4092

FOREIGN PATENT DOCUMENTS

| JP | 2002-149316 A | 5/2002 |
| JP | 2002-320209 A | 10/2002 |
| JP | 2005-258679 A | 9/2005 |

* cited by examiner

# MULTI-DIRECTION COMMUNICATION APPARATUS AND MULTI-DIRECTION COMMUNICATION METHOD

CROSS REFERENCE TO RELATED APPLICATIONS

This application is a U.S. National Phase of International Patent Application No. PCT/JP2019/013934 filed on Mar. 29, 2019, which claims priority benefit of Japanese Patent Application No. JP 2018-077480 filed in the Japan Patent Office on Apr. 13, 2018. Each of the above-referenced applications is hereby incorporated herein by reference in its entirety.

TECHNICAL FIELD

The present technique relates to a multi-direction communication apparatus, a multi-direction communication method, and a program, and in particular to a multi-direction communication apparatus, a multi-direction communication method, and a program capable of reducing an uncomfortable feeling to be provided to a user feeling that spaces are continuous in a multi-direction communication system.

BACKGROUND ART

PTL 1 proposes a technique in which, in a three-dimensional space subjected to image capturing, the state of a user or an environment of interest is recognized and in which a particular user portion in a video is mosaicked to generate a video different from or similar to actual data or to generate a virtual video.

On the other hand, in recent years, advanced communication techniques have enabled real-time bidirectional communication for remote dialogs via videos.

CITATION LIST

Patent Literature

PTL 1

Japanese Patent Laid-open No. 2005-258679

SUMMARY

Technical Problem

In the real-time bidirectional communication, in a case where the communication is intercepted to interrupt the video, it is difficult for the technique in PTL 1 to virtually generate the interrupted video of the communication partner.

In view of such circumstances, an object of the present technique is to make it possible to reduce an uncomfortable feeling to be provided to a user feeling that spaces are continuous in a multi-direction communication system.

Solution to Problem

A multi-direction communication apparatus according to an aspect of the present technique includes a reception section receiving real space information including information representing a situation of a real space for a first user, a generation section generating, on the basis of the received real space information, virtual space information including information representing a situation of a virtual space, and a display control section controlling display, on an apparatus of a second user, of the virtual space represented by the generated virtual space information instead of the real space represented by the real space information.

In the aspect of the present technique, the real space information including information representing the situation of the real space for the first user is received, and on the basis of the received real space information, the virtual space information including information representing the situation of the virtual space is generated. Then, control is performed on the display, on the apparatus of the second user, of the virtual space represented by the generated virtual space information instead of the real space represented by the real space information.

Advantageous Effect of Invention

According to the present technique, it is possible to reduce an uncomfortable feeling to be provided to a user feeling that spaces are continuous in a multi-direction communication system.

Note that the effect described here is not necessarily limited and that any of the effects described in the present disclosure may be produced.

DESCRIPTION OF EMBODIMENTS

An embodiment of the present technique will be described below. The description will be given in the following order.
1. Outline of System
2. Configuration of Information Processing Apparatus
3. Operation
4. Conclusion
5. Other

1. OUTLINE OF SYSTEM

Configuration Example of Multi-Direction Communication System

Figure 1:
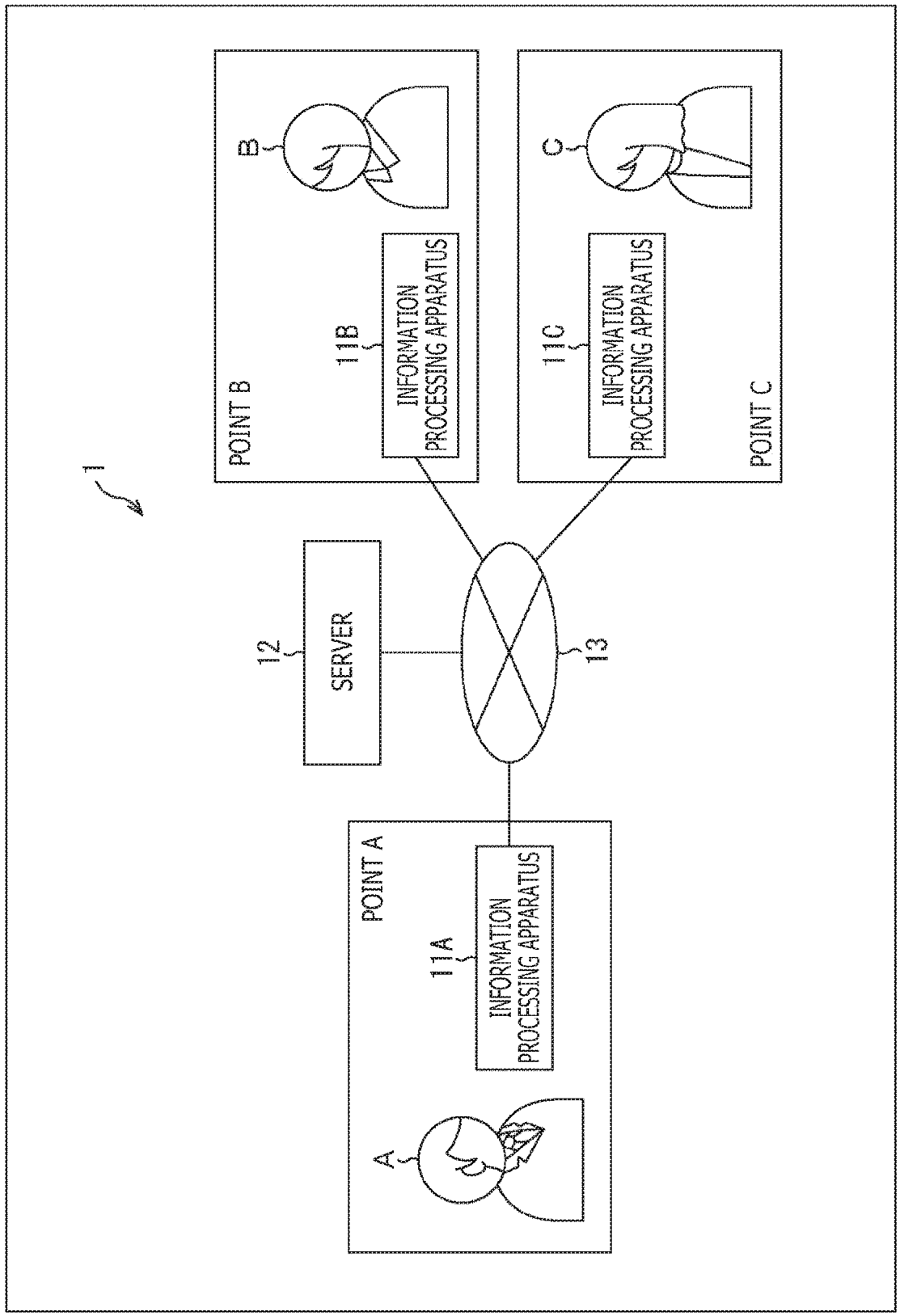
FIG. 1 is a diagram illustrating a multi-direction communication system to which the present technique is applied.

FIG. 1 is a diagram illustrating a multi-direction communication system to which the present technique is applied.

As illustrated in FIG. 1, a multi-direction communication system 1 includes information processing apparatuses 11A to 11C and a server 12 connected together via a network 13 such as the Internet.

The information processing apparatus 11A, the information processing apparatus 11B, and the information processing apparatus 11C are respectively arranged at a point A corresponding to a space for a user A, a point B corresponding to a space for a user B, and a point C corresponding to a space for a user C. The information processing apparatus 11A, the information processing apparatus 11B, and the information processing apparatus 11C connect the spaces for the users together through images, voices, and other information channels to make the users feel that the spaces are linked together.

For example, the information processing apparatus 11A, the information processing apparatus 11B, and the information processing apparatus 11C can make living rooms of houses of a parent and a child living away from each other appear linked to the child and the parent via display apparatuses corresponding to windows or doors. In a case where the living rooms are made to appear linked, the users A to C can live while recognizing the situation of another user (for example, the situation of the child or the situation of the parent).

Staging of a sense of linkage as described above is performed by transmitting and receiving, between each of the information processing apparatus 11A, the information processing apparatus 11B, and the information processing apparatus 11C, space information including information representing the situation of each space. The space information is information including space image information obtained by using a camera to capture images, space voice information obtained by using a microphone or the like to collect voice, or the like. Thus, the information processing apparatus 11A, the information processing apparatus 11B, and the information processing apparatus 11C function as space information sharing apparatuses that share the space information.

The multi-direction communication system 1 configured as described above may have difficulty transmitting the space information in real time due to communication, equipment, or the state of the user, in some cases.

In a case where real-time transmission of the space information is difficult, the multi-direction communication system 1 executes processing of using accumulated data of the space information to generate virtual space information representing the situation of a virtual space and causing a virtual space to be displayed on the basis of the virtual space information. Thus, instead of display of the actual space, display of an approximate space can be continued.

The virtual space information is information including virtual space image information virtually representing the visually perceivable situation of a space, virtual space voice information virtually representing the auditorily perceivable situation of the space, and the like.

The virtual space information is generated by using a combination of accumulated data with context information that can be acquired in real time or predicted as the near future. The context information is information representing the state of the user and obtained by sensing. The state of the user includes the state of the space for the user.

In a case where not only the accumulated data but also the context information is used as metadata, virtual space information can be generated that enables representation of a virtual space more similar to the actual space.

For example, each of the information processing apparatuses 11A to 11C executes multi-direction communication synchronization processing, space information transmission and reception processing, virtual space information generation processing, switching presentation processing, and the like. At least part of such processing may be executed by the server 12. In an example illustrated in FIG. 1, the multi-direction communication system 1 includes the server 12 but may not necessarily include the server 12.

This prevents the connection from being interrupted, eliminates an uncomfortable feeling, and allows provision of a comfortable sense of space linkage. The sense of linkage is a feeling that spaces are linked together and can be rephrased as a sense of security or a sense of mutual existence.

Note that the multi-direction communication system 1 can connect two points or make multipoint connections for three or more points.

Hereinafter, in a case where the information processing apparatuses 11A to 11C need not be distinguished from one another, the information processing apparatuses 11A to 11C are referred to as the information processing apparatus 11 as appropriate.

Example of Output Information

Figure 2:
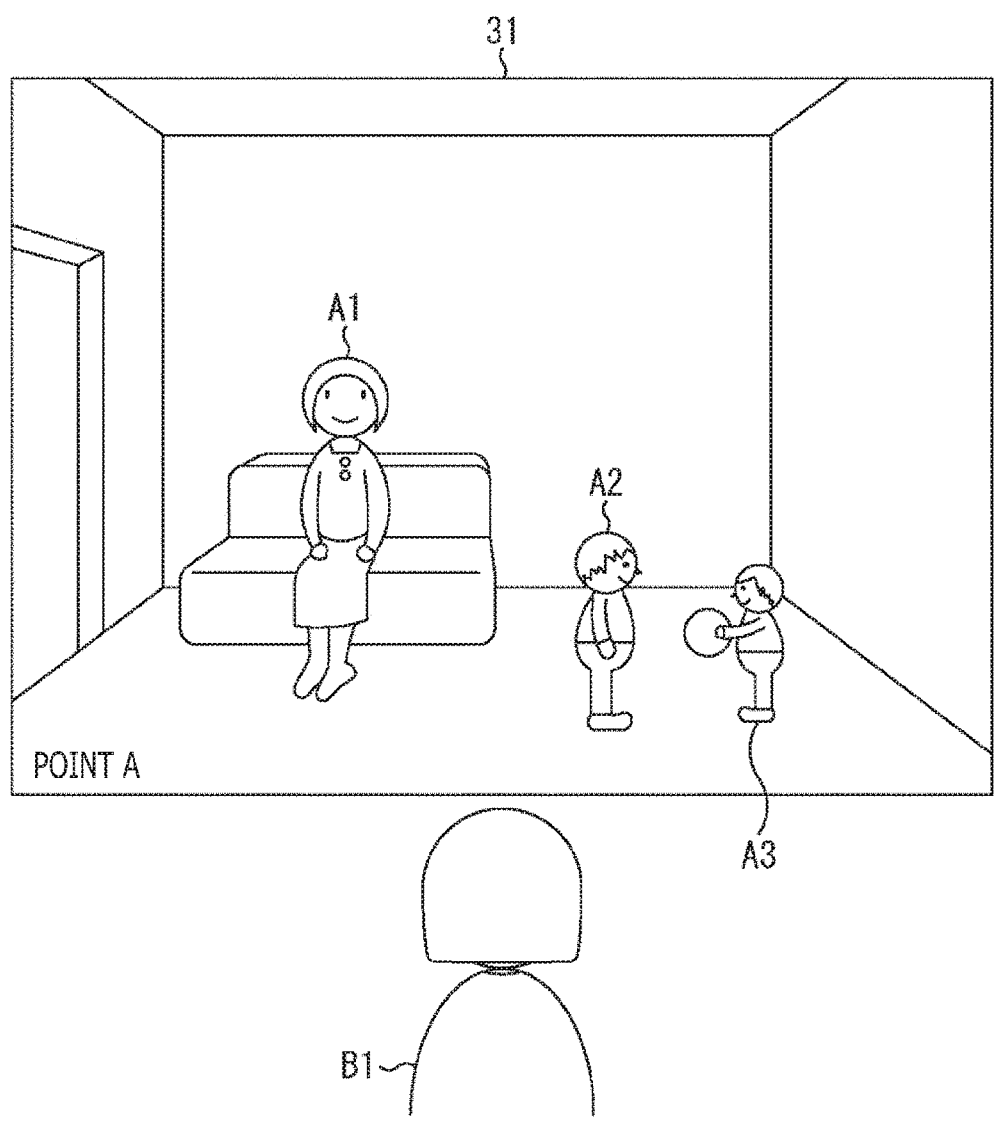
FIG. 2 is a diagram illustrating an example of output information.

FIG. 2 is a diagram illustrating an example of output information.

In an example in FIG. 2, at the point B corresponding to a space for a user B1, space image information representing the situation of the space at the point A corresponding to the communication destination is displayed as output information 31. The output information 31 is displayed by the information processing apparatus 11B located at the point B. It is assumed that users A1 to A3 are at the point A. Note that the space image information has an optional aspect ratio.

For example, the user A1 in the output information 31 is a mother in the age of raising a child, and the user A2 and the user A3 are children. In the example in FIG. 2, it is assumed that the user A1 is interested in the point B where the user B1 is, and is viewing the space image information regarding the point B displayed on a display apparatus located in front of the user A1. The space image information displayed on the display apparatus located in front of the user A1 is information representing the situation of the point B. The space image information representing the situation of the point B displays the user B1 as described below. Note that, in the example in FIG. 2, the user A2 and the user A3 are assumed to take no interest in the space image information regarding the point B and to be playing.

Figure 3:
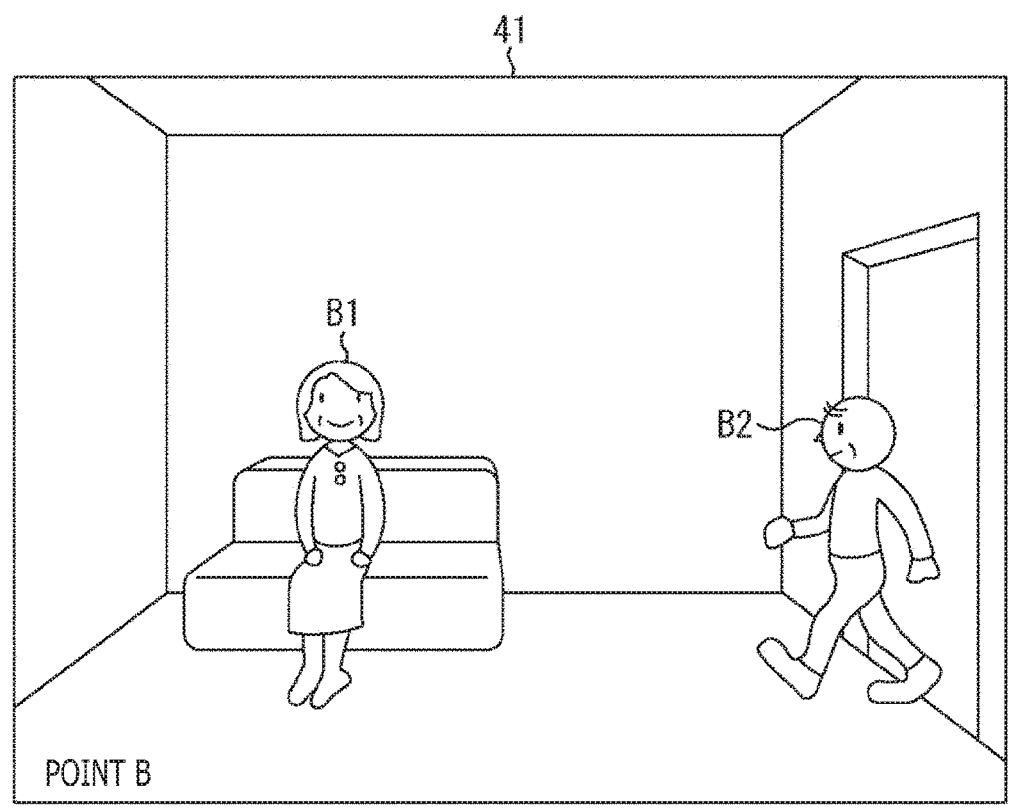
FIG. 3 is a diagram illustrating an example of the output information.

FIG. 3 is a diagram illustrating an example of the output information.

In an example in FIG. 3, at the point A corresponding to the space for the user A1, space image information representing the situation of the space at the point B corresponding to the communication destination is displayed as output information 41. The output information 41 is displayed by the information processing apparatus 11A located at the point A. It is assumed that the user B1 and a user B2 are at the point B.

For example, the user B1 is the mother of the user A1 and a grandmother of the user A2 and the user A3. The user B2 is the father of the user A1 and a grandfather of the user A2 and the user A3. In the example in FIG. 3, it is assumed that the user B1 is interested in the point A and is viewing the space image information (output information 31 in FIG. 2) regarding the point A displayed on a display apparatus located in front of the user B1. The user B2 is coming through the door into the space where the user B1 is.

Continuing the real-time display of such output information enables users at remote locations to get a feeling that the users are in adjacent rooms.

2. CONFIGURATION OF INFORMATION PROCESSING APPARATUS

Configuration of Information Processing Apparatus

Figure 4:
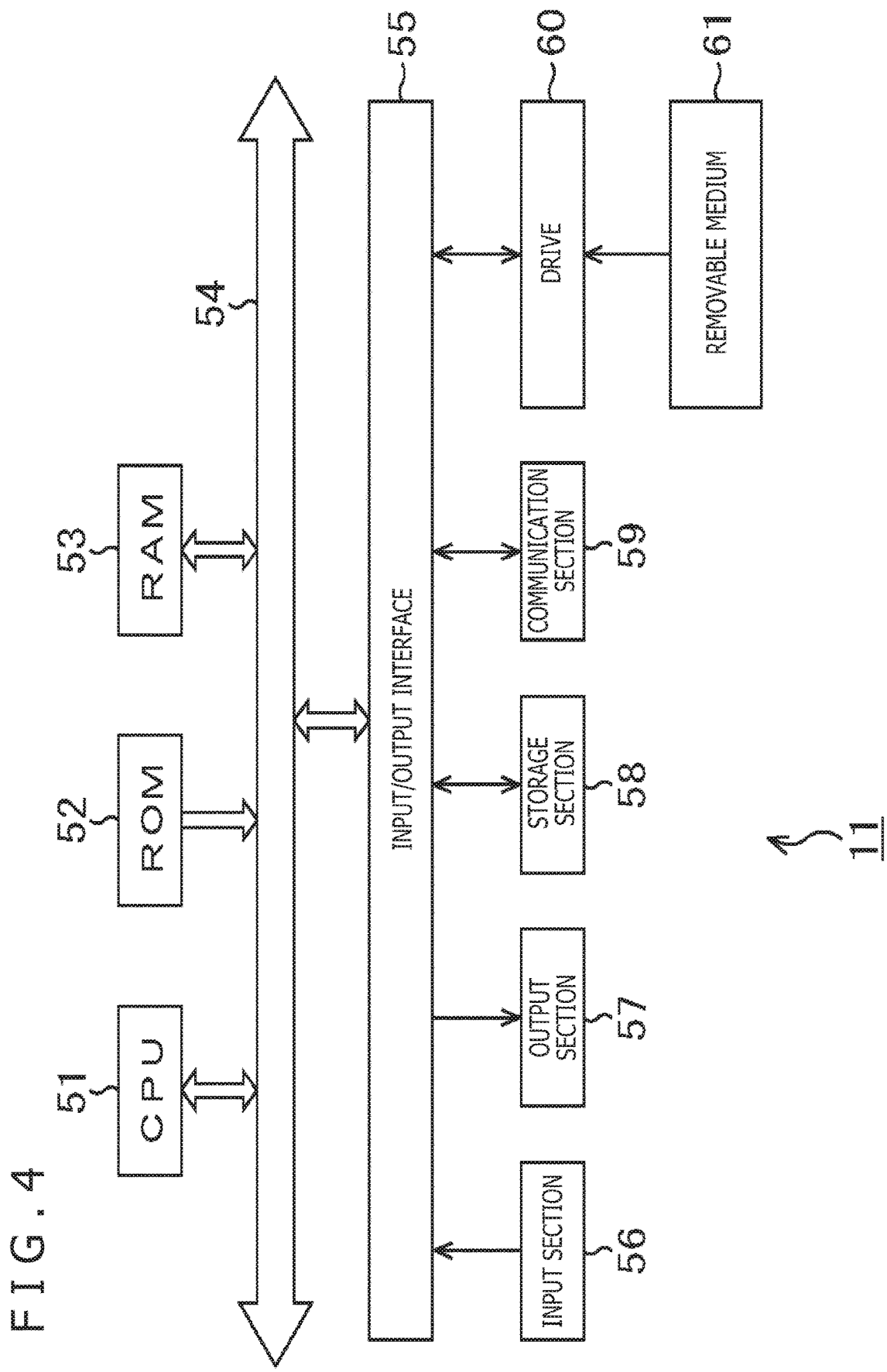
FIG. 4 is a block diagram illustrating a configuration example of hardware of an information processing apparatus.

FIG. 4 is a block diagram illustrating a configuration example of hardware of the information processing apparatus 11.

A CPU 51, a ROM 52, and a RAM 53 are mutually connected by a bus 54. Further, the bus 54 is connected to an input/output interface 55.

The input/output interface 55 is connected to an input section 56, an output section 57, a storage section 58, a communication section 59, and a drive 60.

The input section 56 acquires space information. The space information acquired by the input section 56 includes, for example, an image of the space for the user, voice, environment data, text, a haptic sense, and odors. The space for the user includes not only the space where the user is present but also a space (where the user may be absent) such as a room associated with the user.

Additionally, the space information includes information representing the situation of the space such as the brightness of the space, the size of the space, the height of the space, an air flow, temperature, humidity, environmental sound, and the state of the information processing apparatus 11. The space information includes information representing the state of the user such as the position of the user, the distance between the user and the display area of the output information, motion of the user, the point of regard of the user, the number and organization of users in the same space, and the posture of the user.

The input section 56 includes a camera capturing images of surroundings, a microphone detecting surrounding sounds, sensors, and the like. The sensors detect various pieces of information regarding the inside or the surroundings of a space. The sensors include, for example, physical sensors such as a temperature sensor, a humidity sensor, an illuminance sensor, an odor sensor, a human-presence sensor, a vibration sensor, an air flow sensor, and a door open/close sensor, and an IOT sensors installed in an home automation system, a building, and an urban infrastructure system.

For each of the camera, the microphone, and the sensor, the number of apparatuses is not limited to one but may be plural. The combination of the sensors provided in the information processing apparatus 11 can be optionally changed. Instead of the camera, the microphone, and the sensor provided as components of the information processing apparatus 11, an external camera, an external microphone, and an external sensor may obtain information, which may be acquired at the input section 56.

The output section 57 includes a display apparatus such as a display or a projector, a voice output apparatus such as a speaker, and a notification apparatus such as an LED lamp or an indicator.

The storage section 58 includes a hard disk, a nonvolatile memory, or the like. The storage section 58 stores, in addition to programs executed by the CPU 51, various kinds of data such as context information and space information.

The communication section 59 includes a network interface. The communication section 59 is connected to the network 13 via wireless or wired communication to mutually communicate with another information processing apparatus 11 via P2P or the server 12.

The drive 60 drives a removable medium 61 and reads out data stored in the removable medium 61 or writes data to the removable medium 61.

The server 12 also has the same configuration as that illustrated in FIG. 4.

Functional Configuration of Information Processing Apparatus

Figure 5:
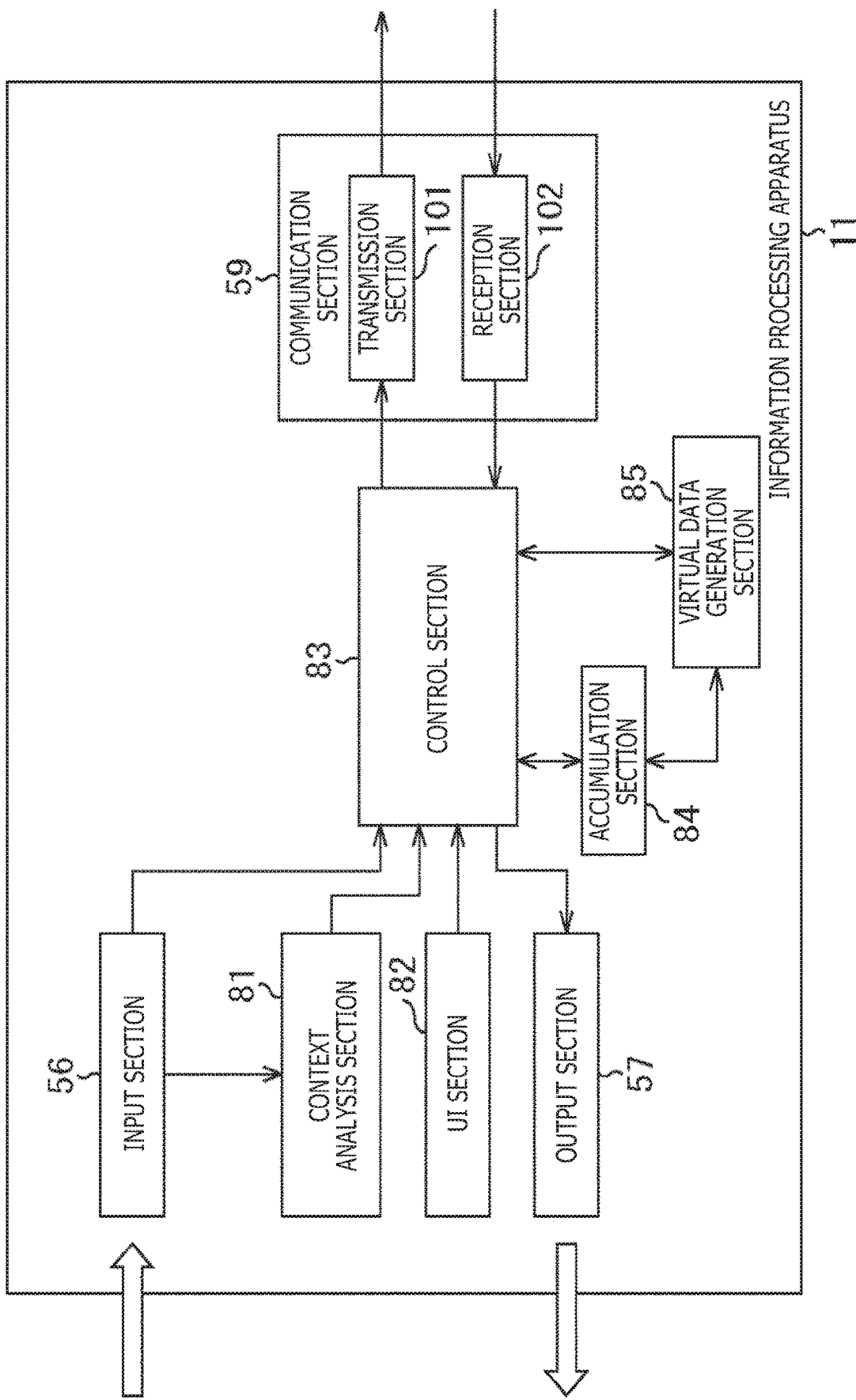
FIG. 5 is a block diagram illustrating a functional configuration example of the information processing apparatus.

FIG. 5 is a block diagram illustrating a functional configuration example of the information processing apparatus 11.

At least some of the functional components illustrated in FIG. 5 are implemented by the CPU 51 in FIG. 4 through executing a predetermined program. In FIG. 5, components corresponding to those in FIG. 4 are denoted by the same reference signs. Duplicate descriptions are omitted as appropriate.

As illustrated in FIG. 5, the information processing apparatus 11 includes a context analysis section 81, a UI (User Interface) section 82, a control section 83, an accumulation section 84, and a virtual data generation section 85. The communication section 59 includes a transmission section 101 and a reception section 102.

The context analysis section 81 performs analysis using image information, voice information, information from the physical sensor, or information from the IoT sensor supplied from the input section 56 or a combination of at least any of these types of information, thereby generating context information corresponding to results of analysis.

The image information is information obtained by using the camera, such as a face, a person, a motion, an environment, and a state. The voice information is information obtained by using the microphone, such as a voice, a conversation, a sound, an environment, and a sound field. The information from the physical sensor is information such as vibration, an air flow, heat, and illuminance. The information from the IoT sensor is information detected by sensors installed in a home automation system, a building, an urban infrastructure system, and the like.

The context information is information obtained by sensing and representing the state of the user, as described above. The context information obtained by the context analysis section 81 through analysis is supplied to the control section 83.

The UI section 82 includes a remote controller, a controller, or the like, and outputs, to the control section 83, operation information corresponding to operation of the user.

The control section 83 functions as a calculation processing apparatus and a control apparatus to control operations in general of the information processing apparatus 11 according to various programs. The control section 83 causes space information regarding the communication destination supplied from the reception section 102 to be accumulated in the accumulation section 84.

The control section 83 determines, on the basis of the state of communication, equipment, or the user, or the like, whether or not the presentation of the space information has changed into an undesired state. In a case where the presentation of the space information has changed into the undesired state, the control section 83 outputs, instead of the space information, virtual space information generated by the virtual data generation section 85 to the display apparatus included in the output section 57 and causes the display apparatus to display the virtual space information.

The control section 83 determines, on the basis of the state of the communication, the equipment, or the user, or the like, whether or not the state of the communication is degraded. The control section 83 determines, on the basis of the state of the communication, the equipment, or the user, or the like, whether the user is absent or approaching. Depending on a determination result, the control section 83 causes the generated virtual space information to be displayed instead of the space information.

In a case where the state of the communication or the like recovers to allow the actual space information to be displayed again, the control section 83 outputs, instead of the virtual space information, the space information transmitted from the communication destination to the display apparatus included in the output section 57 and causes the display apparatus to display the space information.

The accumulation section 84 includes a hard disk, a nonvolatile memory, or the like. The space information transmitted from the communication destination is accumulated in the accumulation section 84.

The virtual data generation section 85 uses the space information accumulated in the accumulation section 84 to generate virtual space information and outputs the generated virtual space information to the control section 83.

Generation of virtual space information uses space model information included in the space information accumulated in the accumulation section 84, such as the date and time, points (locations), user information, and environments (weather, terrains, structures, arrangement, and facilities). Leaning data linked with fluctuating parameters such as the environment may be used to generate virtual space information.

Additionally, generation of virtual space information may use context information regarding the subject or the communication destination. For example, metadata that is included in the context information or acquired in real time or that can be predicted as the near future is used to generate virtual space information, the metadata representing a state such as the time, weather, or brightness.

The transmission section 101 transmits, to the information processing apparatus 11 corresponding to the communication destination, the space information and the context information supplied from the control section 83.

The reception section 102 receives the space information and the context information transmitted from the information processing apparatus 11 corresponding to the communication destination, and outputs the space information and the context information to the control section 83. The space information received from the reception section 102 represents the situation of the space in which the information processing apparatus 11 corresponding to the communication destination is installed, and the context information represents the state of the user obtained by sensing.

Generation of Virtual Space Information

Now, generation of virtual space information will be described with reference to FIGS. 6 to 8.

Figure 6:
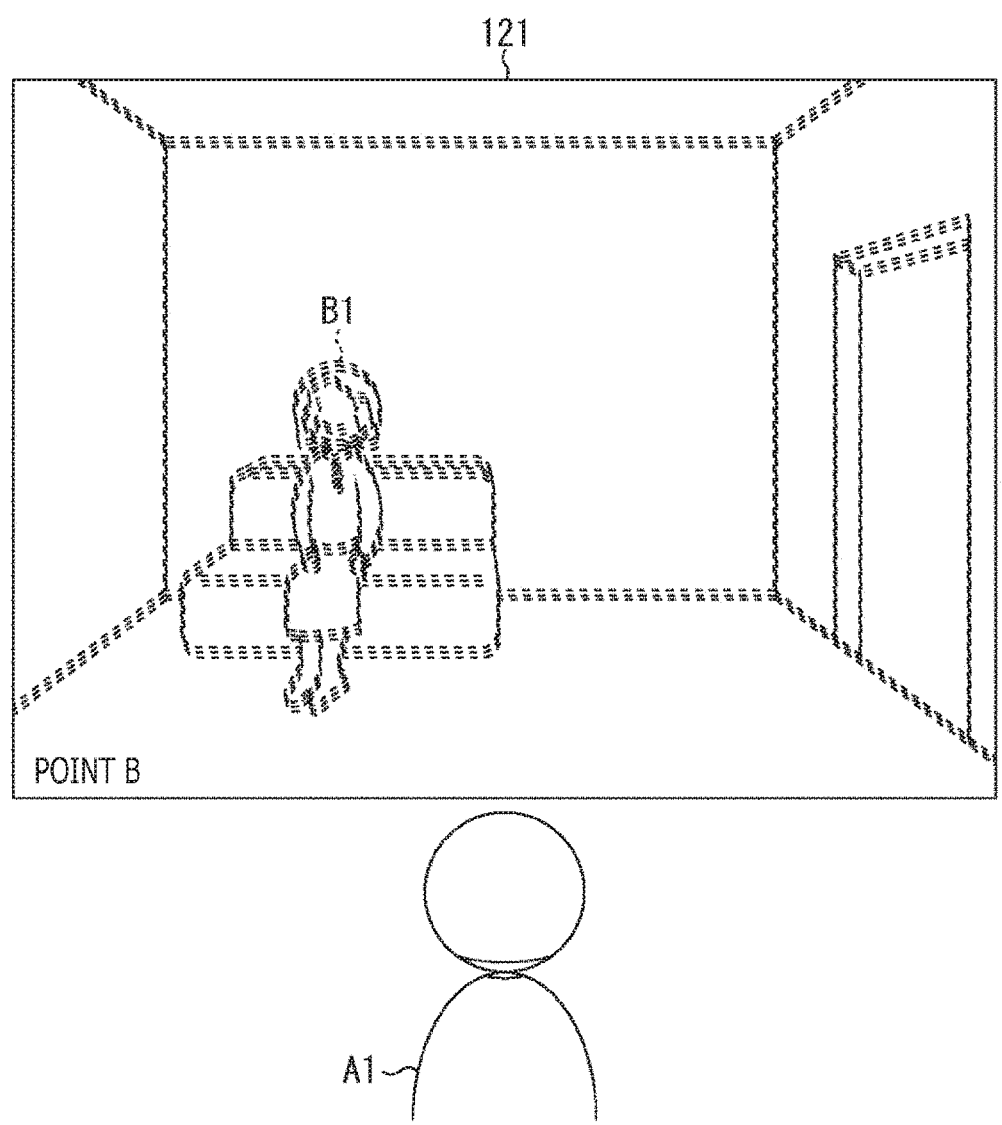
FIG. 6 is a diagram illustrating an example of the output information.

FIG. 6 is a diagram illustrating an example of the output information.

In the example in FIG. 6, at the point A corresponding to the space for the user A1, space image information representing the situation of the space at the point B corresponding to the communication destination is displayed as output information 121. It is assumed that the user B1 is at the point B.

For example, it is assumed that a communication error or the like reduces the resolution of the space image information, leading to a blurred image as illustrated in FIG. 6. The user A1 viewing such blurred space image information has an uncomfortable feeling.

In a case of determining, on the basis of the context information regarding the point A, that the state of the user A1 is that the user A1 is feeling uncomfortable with the space information, the information processing apparatus 11A generates virtual space information using the accumulated data accumulated in the accumulation section 84. Generation of virtual space information may use the context information regarding the point B, which is obtained by a request to the information processing apparatus 11B.

Figure 7:
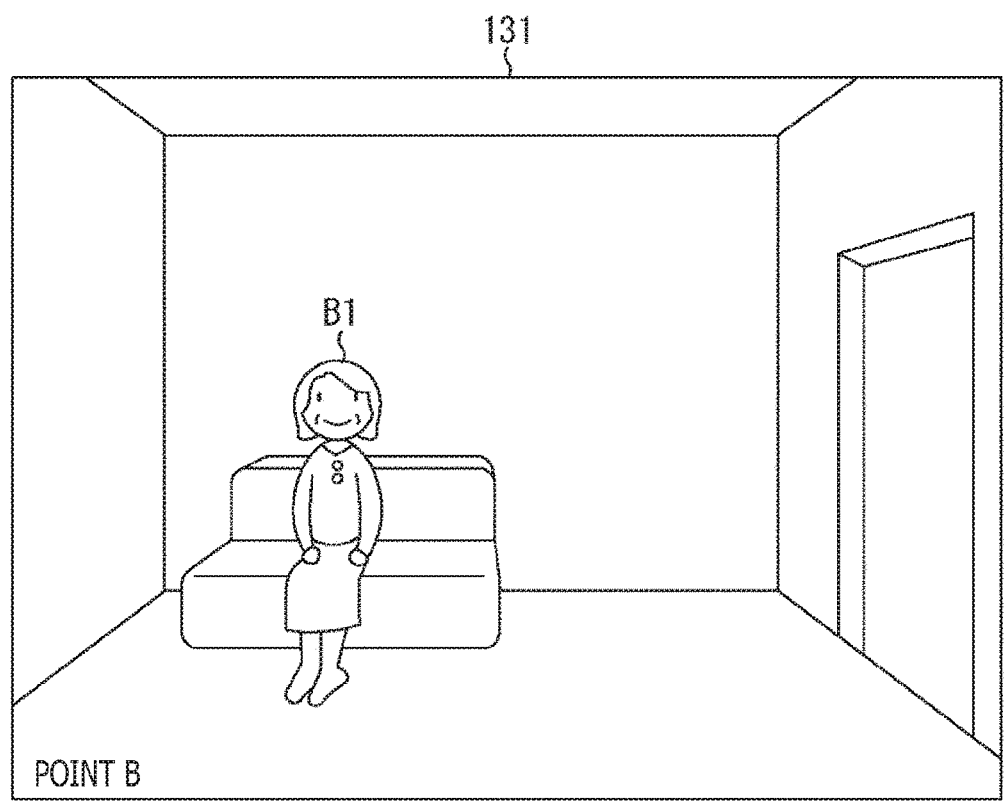
FIG. 7 is a diagram illustrating an example of the output information.

Instead of the space information actually transmitted from the information processing apparatus 11B, the information processing apparatus 11A causes virtual space information to be displayed as illustrated in FIG. 7.

FIG. 7 is a diagram illustrating an example of the output information.

In the example in FIG. 7, at the point A corresponding to the space for the user A1, virtual space image information regarding the point B corresponding to the communication destination is displayed as output information 131. The output information 131 illustrated in FIG. 7 is not information displayed on the basis of the space information actually transmitted from the information processing apparatus 11B but information displayed on the basis of information generated as an image virtually representing the situation of the point B.

The virtual space image information is information generated by using the accumulated data including the transmitted space image information regarding the point B that has been accumulated.

The state of the user B1 in the virtual space image information is that the user B1 is sitting on the sofa and viewing the space image information including the point A as is the case with the state before the communication situation worsens (as in FIG. 6).

In a case where the communication situation thus worsens, the virtual space image information is displayed instead of the actual space image information regarding the point B, enabling a sense of connection to be continuously provided with no uncomfortable feeling to the user A1.

Additionally, in a case of determining that the space information transmitted in real time can be presented again due to recovery of the communication situation or the like, the information processing apparatus 11A causes the space information actually transmitted from the information processing apparatus 11B to be displayed instead of the virtual space information.

Figure 8:
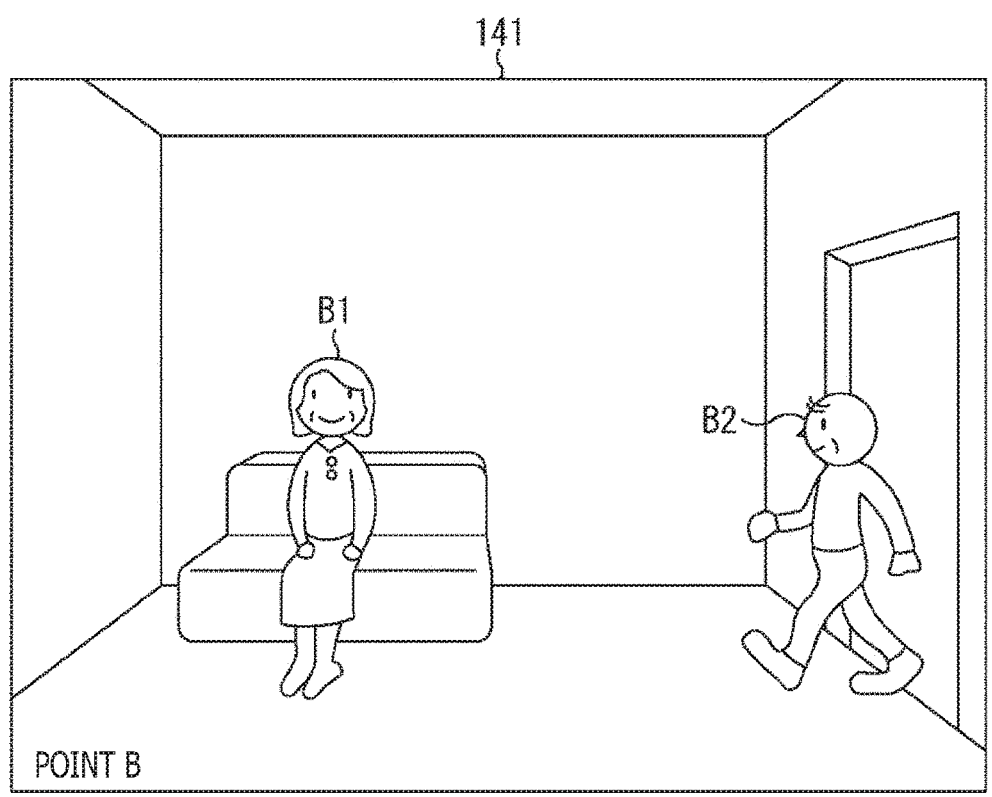
FIG. 8 is a diagram illustrating an example of the output information.

FIG. 8 is a diagram illustrating an example of the output information.

In the example in FIG. 8, at the point A corresponding to the space for the user A1, the space image information representing the situation of the point B corresponding to the communication destination is being displayed as output information 141. The output information 141 illustrated in FIG. 8 is information displayed on the basis of the space information actually transmitted from the information processing apparatus 11B.

The user B1 and the user B2 are viewed in the output information 141. The state of the user B1 is that the user B1 is sitting on the sofa and viewing the space image information including the point A as in FIG. 7.

In a case where the communication situation thus recovers, the actual space information regarding the point B is displayed instead of the virtual space information, enabling a sense of connection to be continuously provided to the user A1.

Here, there is a difference between the space image information in FIG. 6 and the virtual space image information in FIG. 7. Additionally, there is also a difference between the virtual space image information in FIG. 7 and the space image information in FIG. 8.

With the display thus switched to image information with a difference, the user is provided with an uncomfortable feeling. The information processing apparatus 11A performs an operation illustrated in FIG. 9 to mitigate the uncomfortable feeling.

Figure 9:
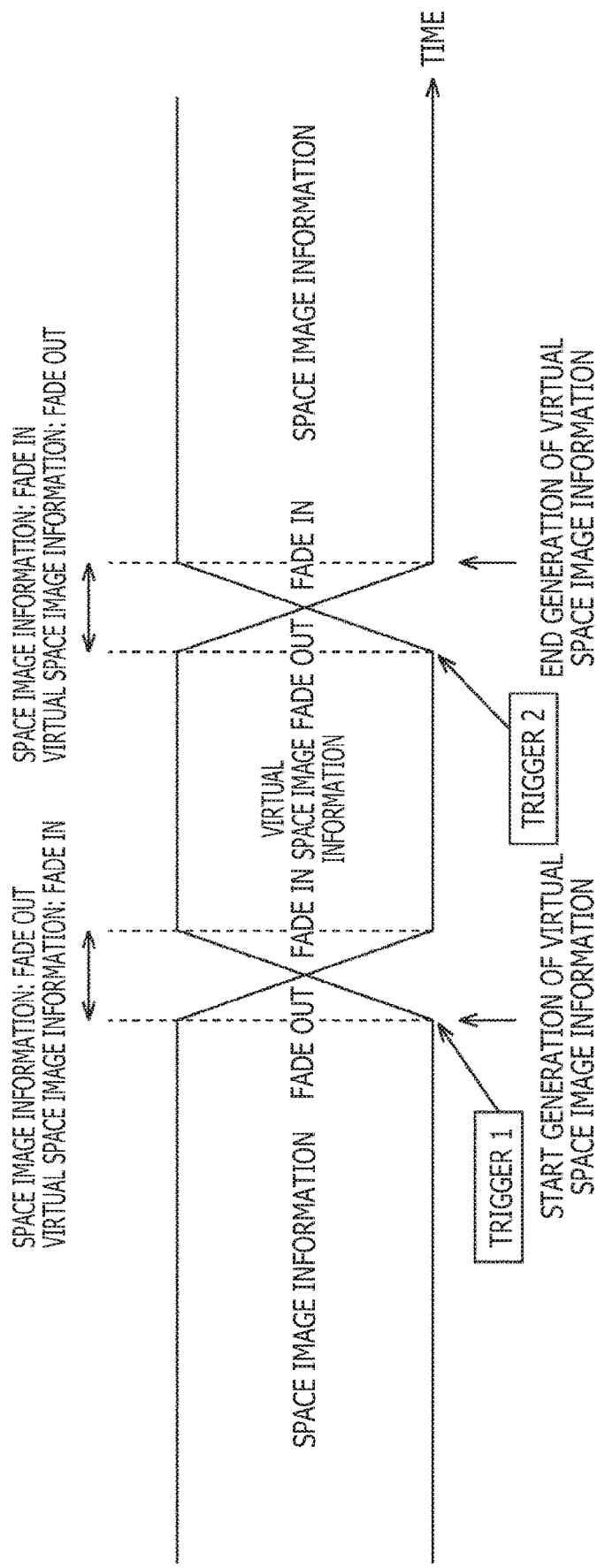
FIG. 9 is a diagram illustrating an output target switching operation.

FIG. 9 is a diagram illustrating an output target switching operation.

For example, in a case where the virtual space image information in FIG. 7 is presented instead of the space image information in FIG. 6, with a determination result (YES or NO) of predetermined determination processing of the information processing apparatus 11 used as a trigger 1 generation of virtual space information is started while the virtual space image information is simultaneously faded in. Further, in addition to the fade-in of the virtual space image information, fade-out of the space image information is performed, and after the end of fade-out of the space image information, the virtual space image information is presented.

Now, in a case where the space image information in FIG. 8 is presented instead of the virtual space image information in FIG. 7, the virtual space information is faded out using, as a trigger 2, the determination result of the predetermined determination processing of the information processing apparatus 11. Further, in addition to the fade-out of the virtual space image information, fade-in of the space image information is performed, and after the end of fade-out of the virtual space image information, generation of virtual space image information is ended and the space image information is presented.

Note that FIG. 9 illustrates a space image information switching operation but that switching of another space information such as space voice information may be similarly performed.

As described above, the fade-out and fade-in periods are provided to allow the output target to be switched, enabling the uncomfortable feeling to be mitigated.

Note that the switching operation in FIG. 9 is an example in which, at the time of switching to the virtual space image information, the user has an uncomfortable feeling due to degraded communication quality of the space image information or the like.

In this regard, with reference to FIG. 10, a case will be described in which the user is prevented from having an uncomfortable feeling at the time of switching to the virtual space image information for energy saving and bandwidth saving.

Figure 10:
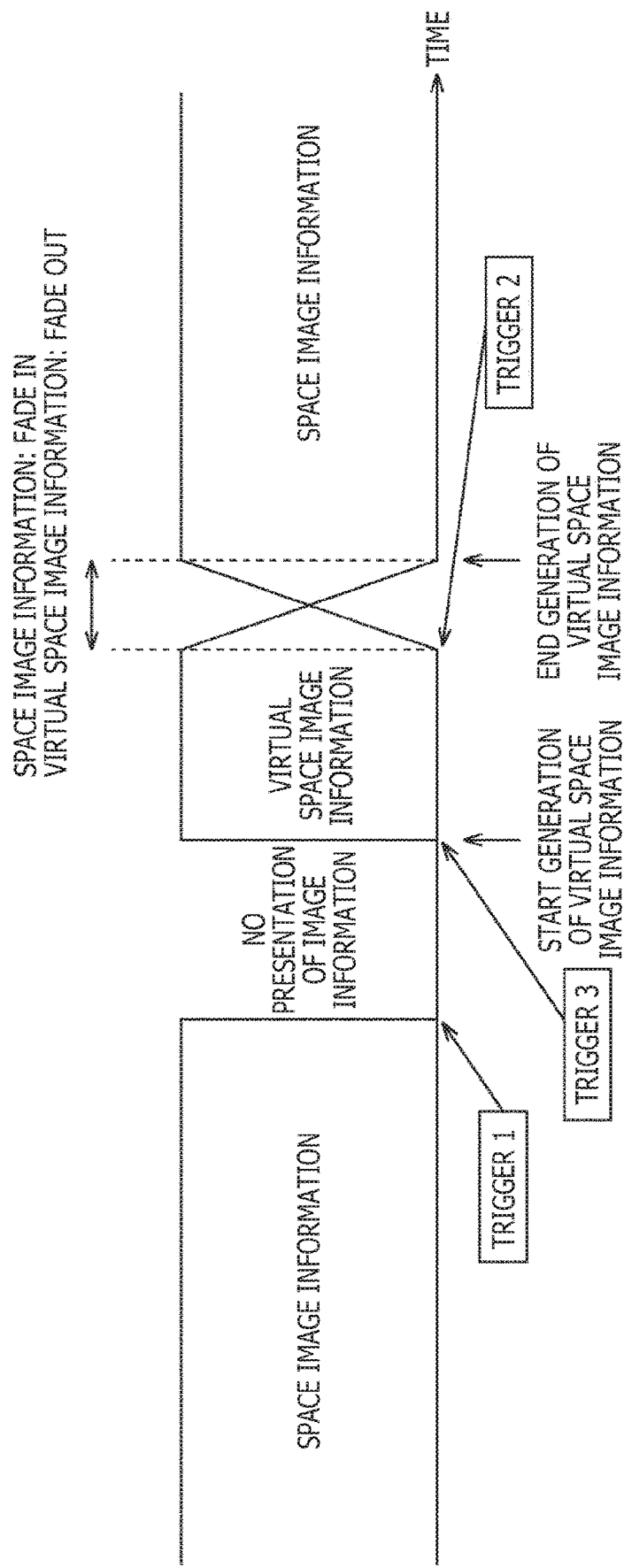
FIG. 10 is a diagram illustrating the output target switching operation.

FIG. 10 is a diagram illustrating another example of the output target switching operation.

For example, in a case where the virtual space image information in FIG. 7 is presented instead of the space image information in FIG. 6, the presentation of the space image information is suspended using, as the trigger 1, the determination result of the predetermined determination processing of the information processing apparatus 11. Thus, the information processing apparatus 11 provides no presentation of image information. Subsequently, the determination result of the predetermined determination processing of the information processing apparatus 11 is used as a trigger 3, and the trigger 3 starts generation of virtual space image information while simultaneously presenting the virtual space image information.

Now, a case in which the space image information in FIG. 8 is presented instead of the virtual space image information in FIG. 7 is similar to the case in FIG. 9, and description of the case in FIG. 10 is omitted.

In a case where the uncomfortable feeling need not be mitigated as described above, the fade-out and fade-in periods may be omitted.

3. OPERATION

Processing Example 1 of Multi-Direction Communication System

Figure 11:
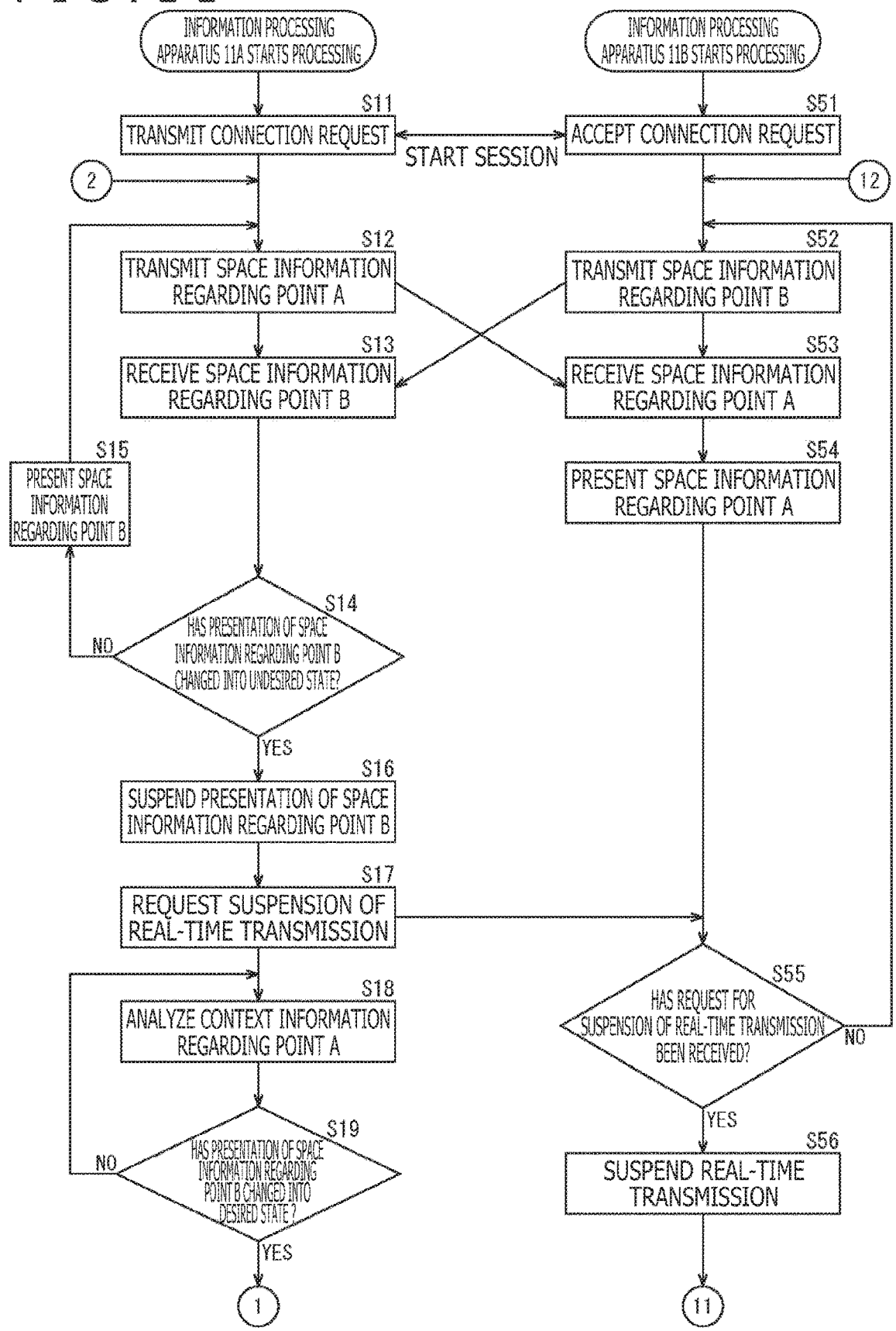
FIG. 11 is a flowchart illustrating space connection processing of the multi-direction communication system.
Figure 12:
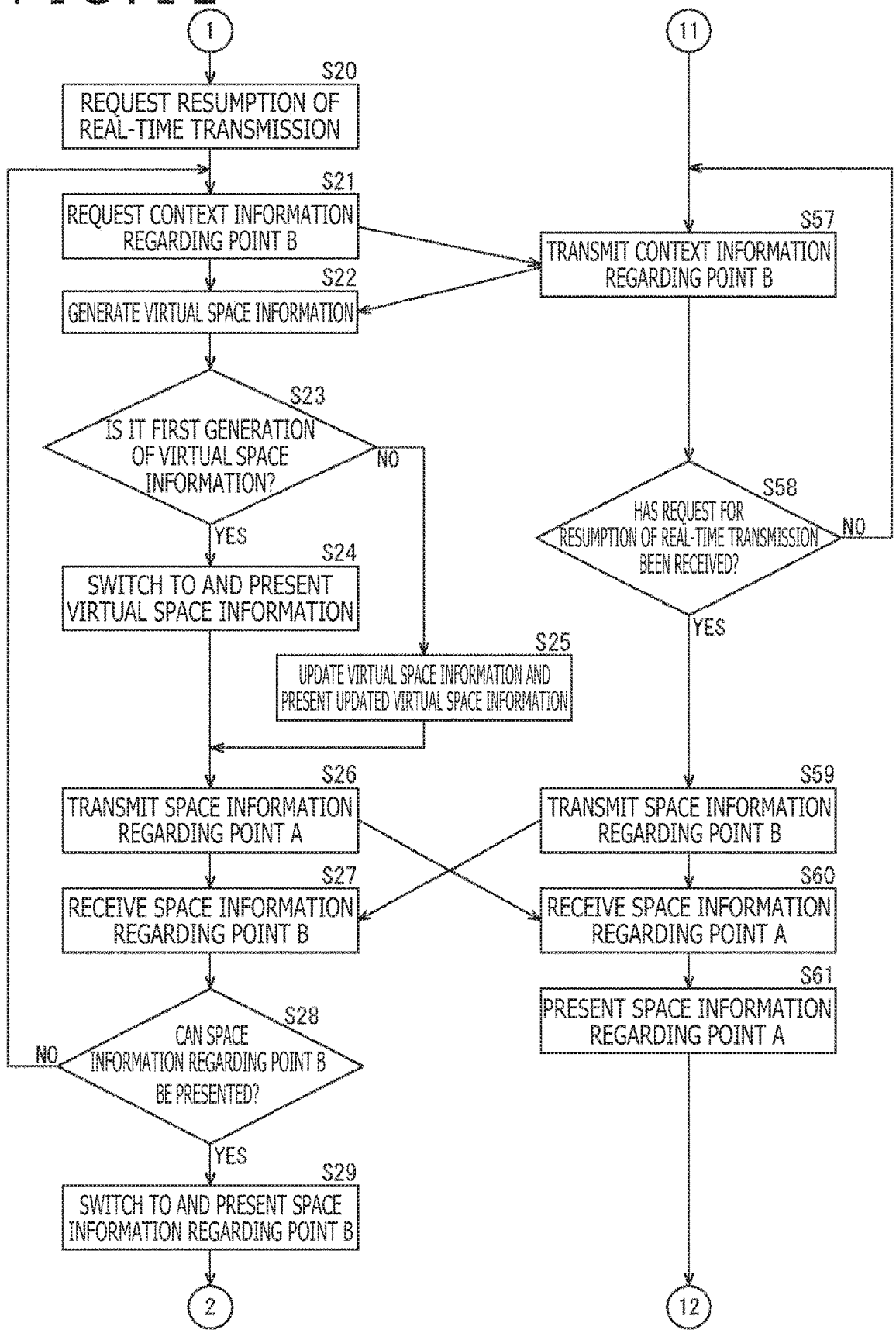
FIG. 12 is a flowchart continued from FIG. 11 and illustrating the space connection processing of the multi-direction communication system.

FIG. 11 and FIG. 12 are flowcharts illustrating space connection processing of the multi-direction communication system 1. FIG. 11 and FIG. 12 illustrate the switching operation in FIG. 10.

FIG. 11 and FIG. 12 illustrate the space connection processing executed by the information processing apparatus 11A and the information processing apparatus 11B. The information processing apparatus 11A and the information processing apparatus 11B are information processing apparatuses provided at different points. The user of the information processing apparatus 11A is the user A, and the user of the information processing apparatus 11B is the user B.

In step S11, the transmission section 101 of the information processing apparatus 11A transmits a connection request to the information processing apparatus 11B.

In response, in step S51, the reception section 102 of the information processing apparatus 11B accepts the connection request from the information processing apparatus 11A. The processing in steps S11 and S51 starts a session between the information processing apparatus 11A and the information processing apparatus 11B.

In step S12, the transmission section 101 of the information processing apparatus 11A transmits, to the information processing apparatus 11B, the space information regarding the point A corresponding to the space for the user A.

On the other hand, in step S52, the transmission section 101 of the information processing apparatus 11B transmits, to the information processing apparatus 11A, the space information regarding the point B corresponding to the space for the user B.

In step S13, the reception section 102 of the information processing apparatus 11A receives the space information regarding the point B corresponding to the space for the user B, the space information having been transmitted from the information processing apparatus 11B.

In step S53, the reception section 102 of the information processing apparatus 11B receives the space information regarding the point A corresponding to the space for the user A, the space information having been transmitted from the information processing apparatus 11A.

In step S54, the output section 57 of the information processing apparatus 11B presents the space information regarding the point A. The space information regarding the point A received by the reception section 102 is supplied to the output section 57 via the control section 83. Specifically, the display apparatus of the output section 57 presents an image corresponding to the space image information regarding the point A, and the speaker of the output section 57 presents a voice corresponding to the space voice information regarding the point A.

Additionally, in step S14, the control section 83 of the information processing apparatus 11A determines whether or not the presentation of the space information regarding the point B has changed into the undesired state. In step S14, in a case where the presentation of the space information regarding the point B is in a desired state, the processing proceeds to step S15.

In step S15, the output section 57 of the information processing apparatus 11A presents the space information regarding the point B. Then, the space connection processing returns to step S12 to repeat the subsequent processing.

With the space information regarding the point B presented at the point A and with the space information regarding the point A presented at the point B, the user A at the point A and the user B at the point B each can have a sense of space adjacent linkage representing a sense of linkage in which the users A and B feel that the spaces for the users A and B are adjacent to each other. The transmission and reception of the space information as described above are continued until the session is ended.

On the other hand, in step S14, the control section 83 determines that the presentation of the space information regarding the point B has changed into the undesired state, the processing proceeds to step S16. The YES determination in the determination processing in step S14 is the trigger 1 described above with reference to FIG. 10.

In step S16, the control section 83 of the information processing apparatus 11A suspends the presentation of the space information regarding the point B because no seamless switching is required. In other words, with the YES determination in the determination processing in step S14 used as the trigger 1, the presentation of the space image information is suspended, so that no image is presented in step S16.

In step S17, the control section 83 of the information processing apparatus 11A requests the information processing apparatus 11B to suspend the real-time transmission. Accordingly, the information processing apparatus 11B suspends the real-time transmission (step S56 described below).

In step S18, the context analysis section 81 of the information processing apparatus 11A analyzes the context information regarding the point A.

In step S19, the control section 83 of the information processing apparatus 11A determines, on the basis of an analysis result from the context analysis section 81, whether or not the presentation of the space information regarding the point B has changed into the desired state.

In step S19, the control section 83 determines that the presentation of the space information regarding the point B has not changed into the desired state, the space connection processing returns to step S18 to repeat the subsequent processing.

In step S19, in a case where the control section 83 determines that the presentation of the space information regarding the point B has changed into the desired state, the processing proceeds to step S20 in FIG. 12. The YES determination in the determination processing in step S19 is the trigger 3 described above with reference to FIG. 10.

In step S20, the control section 83 of the information processing apparatus 11A requests the information processing apparatus 11B to resume the real-time transmission.

In step S21, the control section 83 of the information processing apparatus 11A requests the context information regarding the point B. In response, the information processing apparatus 11B transmits the context information regarding the point B (step S57 described below).

In step S22, the virtual data generation section 85 of the information processing apparatus 11A uses the space information including the accumulated data of the accumulation section 84 to generate virtual space image information. At this time, the context information regarding the point B may be used.

In step S23, the control section 83 of the information processing apparatus 11A determines whether or not this is the first generation of virtual space information. In step S23, in a case where the control section 83 determines that this is the first generation of virtual space information, the processing proceeds to step S24.

In step S24, the control section 83 of the information processing apparatus 11A causes the space information output from the output section 57 to be switched to the virtual space information and causes the virtual space information to be presented.

In other words, with the YES determination in the determination processing in step S18 used as the trigger 3, generation of virtual space image information is started in step S22. Additionally, with the YES determination in the determination processing in step S18 used as the trigger 3, the virtual space image information is presented in step S24. In the presentation in step S24, seamless switching can be performed as needed.

In step S23, in a case where the control section 83 determines that this is not the first generation of virtual space information, the processing proceeds to step S25.

In step S25, the control section 83 of the information processing apparatus 11A causes the virtual space information output from the output section 57 to be updated and causes the updated virtual space information to be presented.

In step S26, the transmission section 101 of the information processing apparatus 11A transmits the space information regarding the point A to the information processing apparatus 11B.

The information processing apparatus 11B transmits the space information regarding the point B (step S59 described below). In step S27, the reception section 102 of the information processing apparatus 11A receives the space information regarding the point B that is transmitted from the information processing apparatus 11B.

In step S28, the control section 83 of the information processing apparatus 11A determines whether or not the space information regarding the point B can be presented.

In step S28, in a case where the control section 83 determines that the space information regarding the point B is prevented from being presented, the space connection processing returns to step S21 to repeat the subsequent processing.

In step S28, the control section 83 determines that the space information regarding the point B can be presented, the processing proceeds to step S29. The YES determination in the determination processing in step S28 is the trigger 2 described above with reference to FIG. 10.

In step S29, the control section 83 of the information processing apparatus 11A causes the virtual space information output from the output section 57 to be switched to the space information regarding the point B and causes the space information regarding the point B to be presented. In other words, with the YES determination in the determination processing in step S28 used as the trigger 2, the virtual space information is faded out in step S29. This leads to seamless switching between the virtual space information and the space information regarding the point B.

After the processing in step S29, the space connection processing returns to step S12 to repeat the subsequent processing.

On the other hand, after step S54, the processing by the information processing apparatus 11B proceeds to step S55.

In step S55, the control section 83 of the information processing apparatus 11B determines whether or not a request for suspension of the real-time transmission has been received. In step S55, in a case where the control section 83 determines that no request for suspension of the real-time transmission has been received, the space connection processing returns to step S52 to repeat the subsequent processing.

In step S55, in a case where the control section 83 determines that the request for suspension of the real-time transmission has been received, the processing proceeds to step S56.

In step S56, the control section 83 of the information processing apparatus 11B suspends the real-time transmission.

After step S56, the processing proceeds to step S57 in FIG. 12.

Additionally, the information processing apparatus 11A requests the context information regarding the point B (step S21 described above). In response, in step S57, the control section 83 of the information processing apparatus 11B transmits the context information regarding the point B to the information processing apparatus 11A.

On the other hand, the information processing apparatus 11A requests resumption of the real-time transmission (step S20 described above). In response, in step S58, the control section 83 of the information processing apparatus 11B determines whether or not a request for resumption of the real-time transmission has been received. In step S58, in a case where the control section 83 determines that no request for resumption of the real-time transmission has been received, the space connection processing returns to step S57 to repeat the subsequent processing.

Note that, although not illustrated in FIG. 11 and FIG. 12, even during suspension of the real-time transmission of the information processing apparatus 11B, in actuality, the information processing apparatus 11A transmits the space information regarding the point A, whereas the information processing apparatus 11B receives and presents the space information regarding the point A.

In step S58, in a case where the control section 83 determines that the request for resumption of the real-time transmission has been received, the processing proceeds to step S59.

In step S59, the transmission section 101 of the information processing apparatus 11B transmits the space information regarding the point B to the information processing apparatus 11A.

The information processing apparatus 11A transmits the space information regarding the point A (step S26 described below). In step S60, the reception section 102 of the information processing apparatus 11B receives the space information regarding the point A that is transmitted from the information processing apparatus 11A.

In step S61, the output section 57 of the information processing apparatus 11B presents the space information regarding the point A that is supplied from the reception section 102 via the control section 83.

After the processing in step S61, the space connection processing returns to step S52 to repeat the subsequent processing.

Note that, with reference to FIG. 11 and FIG. 12, the example has been described in which, in a case where it is determined that the presentation of the space information has changed into the undesired state in step S14, the real-time transmission is suspended. In this regard, suspension of the real-time transmission by the information processing apparatus 11B may resultantly bring the presentation of the space information in the information processing apparatus 11A into the undesired state.

Additionally, in FIG. 11 and FIG. 12, in a case where nothing is presented to the user A, the processing in steps S16 to S20, S55, S56, and S58 may be executed as an option. As described above with reference to FIG. 9, in a case where the virtual space information is presented, with the YES determination in step S14 used as the trigger 1, generation of virtual space image information is started while the virtual space image information is simultaneously faded in. Accordingly, the processing in steps S16 to S20, S55, S56, and S58 is unnecessary processing in a case where the virtual space information is presented.

Processing Example 2 of Multi-Direction Communication System

Figure 13:
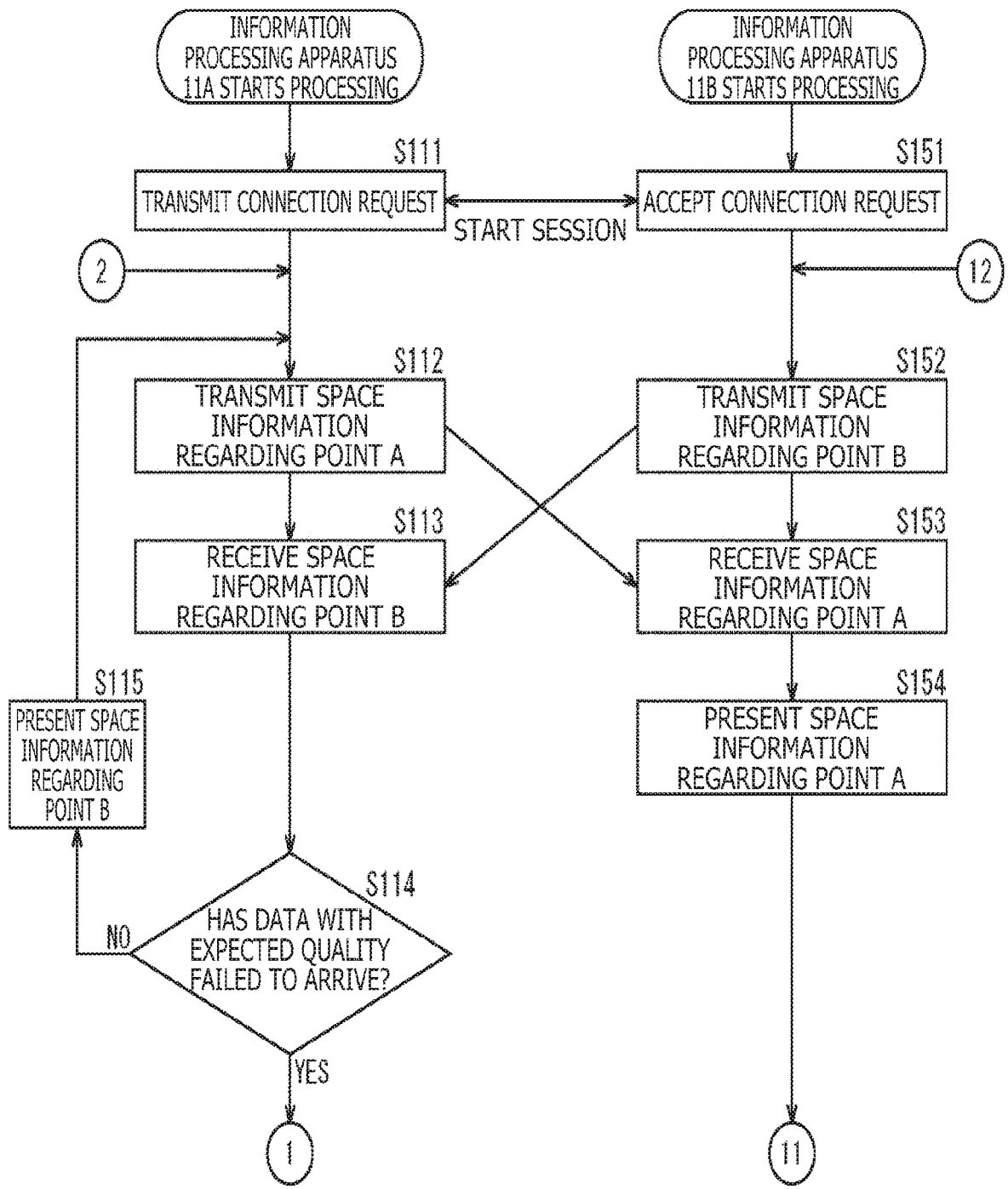
FIG. 13 is a flowchart illustrating another example of the space connection processing of the multi-direction communication system.
Figure 14:
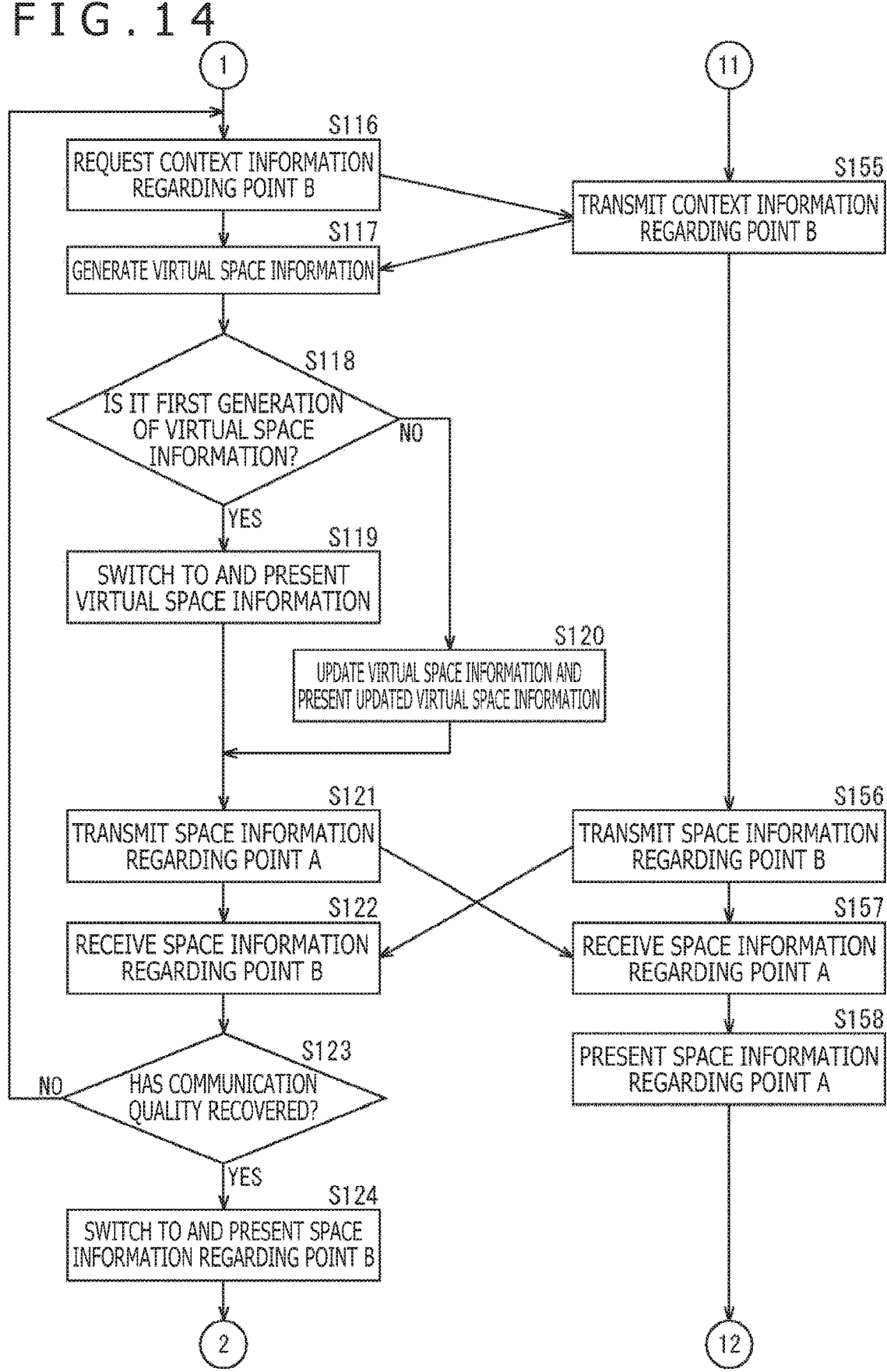
FIG. 14 is a flowchart continued from FIG. 13 and illustrating the space connection processing of the multi-direction communication system.

FIG. 13 and FIG. 14 are flowcharts illustrating another example of the space connection processing of the multi-direction communication system 1. The example in FIG. 13 and FIG. 14 illustrates an example of a case of communication degradation.

In step S111, the transmission section 101 of the information processing apparatus 11A transmits a connection request to the information processing apparatus 11B.

In response, in step S151, the reception section 102 of the information processing apparatus 11B accepts the connection request from the information processing apparatus 11A. The processing in steps S111 and S151 starts a session between the information processing apparatus 11A and the information processing apparatus 11B.

Then, in step S112, the transmission section 101 of the information processing apparatus 11A transmits, to the information processing apparatus 11B, the space information regarding the point A corresponding to the space for the user A.

On the other hand, in step S152, the transmission section 101 of the information processing apparatus 11B transmits, to the information processing apparatus 11A, the space information regarding the point B corresponding to the space for the user B.

In step S113, the reception section 102 of the information processing apparatus 11A receives the space information regarding the point B that is transmitted from the information processing apparatus 11B.

In step S153, the reception section 102 of the information processing apparatus 11B receives the space information regarding the point A that is transmitted from the information processing apparatus 11A.

In step S154, the output section 57 of the information processing apparatus 11B presents the space information regarding the point A.

Additionally, in step S114, the control section 83 of the information processing apparatus 11A determines whether or not data with expected image quality has arrived. In step S114, in a case where the control section 83 determines that data with expected image quality has arrived, the processing proceeds to step S115.

In step S115, the output section 57 of the information processing apparatus 11A presents the space information regarding the point B that is supplied from the reception section 102 via the control section 83. Then, the space connection processing returns to step S112 to repeat the subsequent processing.

With the space information regarding the point B presented at the point A and with the space information regarding the point A presented at the point B, the user A at the point A and the user B at the point B each can have a sense of space adjacent linkage representing a sense of linkage in which the users A and B feel that the spaces for the users A and B are adjacent to each other. The transmission and reception of the space information as described above are continued until the session is ended.

In step S114, in a case where the control section 83 determines that data with expected image quality has not arrived, the processing proceeds to step S116 in FIG. 14. The YES determination in the determination processing in step S114 is the trigger 1 described above with reference to FIG. 9.

In step S116, the control section 83 of the information processing apparatus 11A requests the context information regarding the point B. In response, the information processing apparatus 11B transmits the context information regarding the point B (step S155 described below).

In step S117, the virtual data generation section 85 of the information processing apparatus 11A uses the space information including the accumulated data of the accumulation section 84 to generate virtual space information. At this time, the context information regarding the point B may be used.

In step S118, the control section 83 of the information processing apparatus 11A determines whether or not this is the first generation of virtual space information. In step S118, in a case where the control section 83 determines that this is the first generation of virtual space information, the processing proceeds to step S119.

In step S119, the control section 83 of the information processing apparatus 11A causes the space information output from the output section 57 to be switched to the virtual space information and causes the virtual space information to be presented.

In other words, with the YES determination in the determination processing in step S114 used as the trigger 1, generation of virtual space image information is started in step S117. Additionally, with the YES determination in the determination processing in step S114 used as the trigger 1, the virtual space image information is faded in in step S119.

In step S118, in a case where the control section 83 determines that this is not the first generation of virtual space information, the processing proceeds to step S120.

In step S120, the control section 83 of the information processing apparatus 11A causes the virtual space information output from the output section 57 to be updated and causes the updated virtual space information to be presented.

In step S121, the transmission section 101 of the information processing apparatus 11A transmits the space information regarding the point A to the information processing apparatus 11B.

The information processing apparatus 11B transmits the space information regarding the point B (step S156 described below). In step S122, the reception section 102 of the information processing apparatus 11A receives the space information regarding the point B that is transmitted from the information processing apparatus 11B.

In step S123, the control section 83 of the information processing apparatus 11A determines whether or not the communication quality has recovered.

In step S123, in a case where the control section 83 determines that the communication quality has not recovered, the space connection processing returns to step S116 to repeat the subsequent processing.

In step S123, in a case where the control section 83 determines that the communication quality has recovered, the processing proceeds to step S124. The YES determination in the determination processing in step S123 is the trigger 2 described above with reference to FIG. 10.

In step S124, the control section 83 of the information processing apparatus 11A causes the virtual space information output from the output section 57 to be switched to the space information regarding the point B and causes the space information regarding the point B to be presented. In other words, with the YES determination in the determination processing in step S123 used as the trigger 2, the virtual space information is faded out in step S124. This leads to seamless switching between the virtual space information and the space information regarding the point B.

After the processing in step S124, the space connection processing returns to step S112 to repeat the subsequent processing.

On the other hand, after the processing in step S154, the processing proceeds to step S155 in FIG. 14 in the information processing apparatus 11B.

Additionally, the information processing apparatus 11A requests the context information regarding the point B (step S116 described above). In response, in step S155, the control section 83 of the information processing apparatus 11B transmits the context information regarding the point B to the information processing apparatus 11A.

In step S156, the transmission section 101 of the information processing apparatus 11B transmits the space information regarding the point B to the information processing apparatus 11A.

The information processing apparatus 11A transmits the space information regarding the point A (step S121 described above). In step S157, the reception section 102 of the information processing apparatus 11B receives the space information regarding the point A that is transmitted from the information processing apparatus 11A.

In step S158, the output section 57 of the information processing apparatus 11B presents the space information regarding the point A that is supplied from the reception section 102 via the control section 83.

After the processing in step S158, the space connection processing returns to step S152 to repeat the subsequent processing.

As described above, even in a case where the communication quality of the space information transmitted from the communication destination is degraded, instead of the space information transmitted in real time, the virtual space information is presented that is generated using the accumulated space information.

This inhibits the user from having an uncomfortable feeling due to the degraded communication quality, and a sense of connection can be continuously provided.

In other words, even in a case where a degraded network state temporarily prevents real-time transmission with clear image quality, the present technique reproduces clear images from past accumulated data, allowing a sense of connection to be provided.

Processing Example 3 of Multi-Direction System

Figure 15:
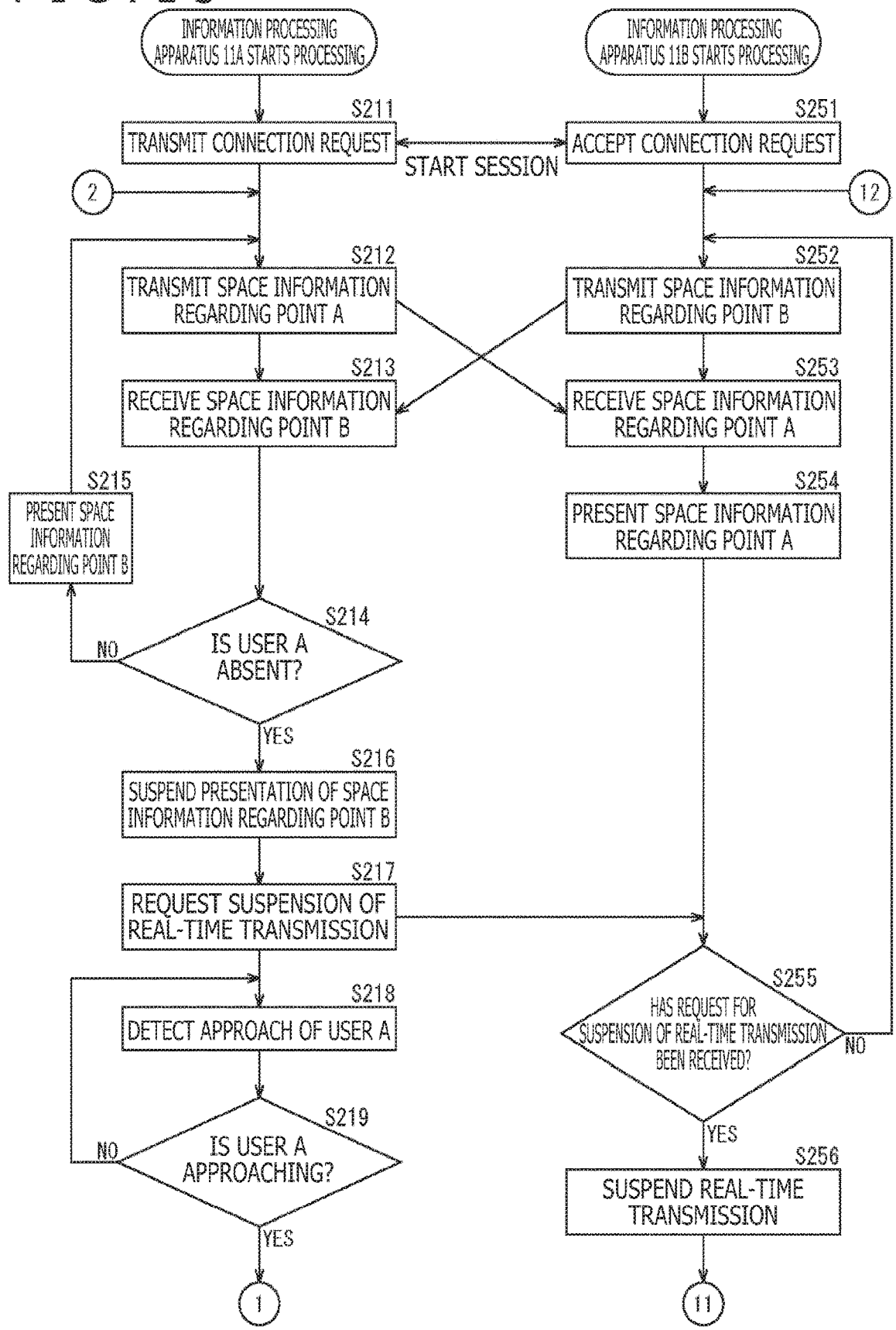
FIG. 15 is a flowchart illustrating yet another example of the space connection processing of the multi-direction communication system.
Figure 16:
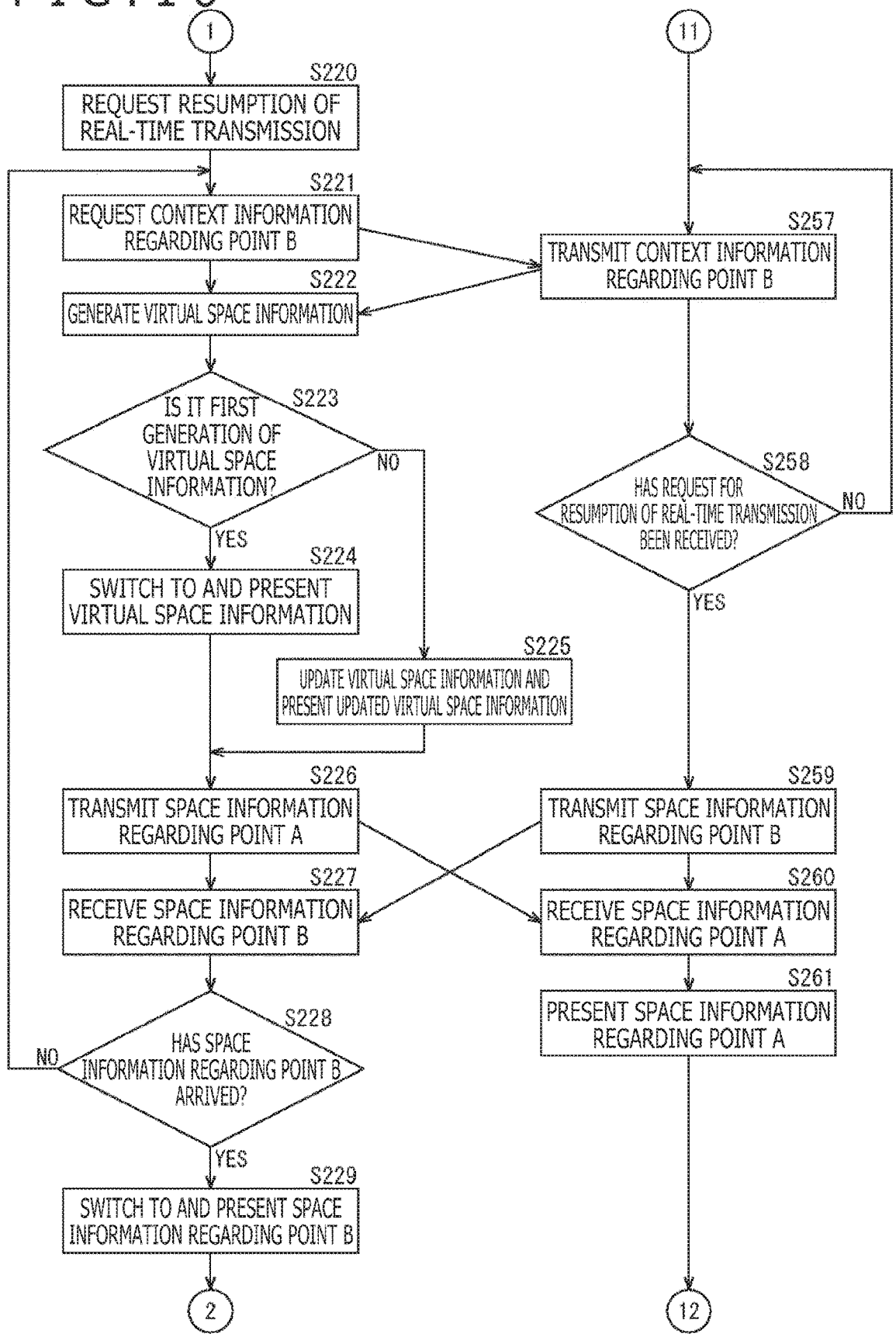
FIG. 16 is a flowchart continued from FIG. 15 and illustrating the space connection processing of the multi-direction communication system.

FIG. 15 and FIG. 16 are flowcharts illustrating yet another example of the space connection processing of the multi-direction communication system 1. The example in FIG. 15 and FIG. 16 illustrates an example of a case of energy saving and bandwidth saving.

In step S211, the transmission section 101 of the information processing apparatus 11A transmits a connection request to the information processing apparatus 11B.

In response, in step S251, the reception section 102 of the information processing apparatus 11B accepts the connection request from the information processing apparatus 11A. The processing in steps S211 and S251 starts a session between the information processing apparatus 11A and the information processing apparatus 11B.

Then, in step S212, the transmission section 101 of the information processing apparatus 11A transmits, to the information processing apparatus 11B, the space information regarding the point A corresponding to the space for the user A.

On the other hand, in step S252, the transmission section 101 of the information processing apparatus 11B transmits, to the information processing apparatus 11A, the space information regarding the point B corresponding to the space for the user B.

In step S213, the reception section 102 of the information processing apparatus 11A receives the space information regarding the point B that is transmitted from the information processing apparatus 11B.

In step S253, the reception section 102 of the information processing apparatus 11B receives the space information regarding the point A that is transmitted from the information processing apparatus 11A.

In step S254, the output section 57 of the information processing apparatus 11B presents the space information regarding the point A.

Additionally, in step S214, the control section 83 of the information processing apparatus 11A determines whether or not the user A is absent. In step S214, in a case where the control section 83 determines that the user A is present, the processing proceeds to step S215.

In step S215, the output section 57 of the information processing apparatus 11A presents the space information regarding the point B. Then, the space connection processing returns to step S212 to repeat the subsequent processing.

With the space information regarding the point B presented at the point A and with the space information regarding the point A presented at the point B, the user A at the point A and the user B at the point B each can have a sense of space adjacent linkage representing a sense of linkage in which the users A and B feel that the spaces for the users A and B are adjacent to each other. The transmission and reception of the space information as described above are continued until the session is ended.

On the other hand, in step S214, in a case where the control section 83 determines that the user A is absent, the processing proceeds to step S216. The YES determination in the determination processing in step S214 is the trigger 1 described above with reference to FIG. 10

In step S216, the control section 83 of the information processing apparatus 11A causes the presentation of the space information regarding the point B to be suspended due to the non-necessity of seamless switching. In other words, with the YES determination in the determination processing in step S214 used as the trigger 1, the presentation of the space image information is suspended in step S216, leading to no image presentation.

In step S217, the control section 83 of the information processing apparatus 11A requests the information processing apparatus 11B to suspend the real-time transmission. Accordingly, the information processing apparatus 11B suspends the real-time transmission (step S256 described below).

In step S218, the control section 83 of the information processing apparatus 11A detects approach of the user A.

In step S219, the control section 83 of the information processing apparatus 11A determines whether or not the user A is approaching. In step S219, in a case where the control section 83 determines that the user A is not approaching, the space connection processing returns to step S218 to repeat the subsequent processing.

In step S219, in a case where the control section 83 determines that the user A is approaching, the processing proceeds to step S220 in FIG. 16. The YES determination in the determination processing in step S219 is the trigger 3 described above with reference to FIG. 10.

In step S220, the control section 83 of the information processing apparatus 11A requests the information processing apparatus 11B to resume the real-time transmission.

In step S221, the control section 83 of the information processing apparatus 11A requests the context information regarding the point B. In response, the information processing apparatus 11B transmits the context information regarding the point B (step S257 described below).

In step S222, the virtual data generation section 85 of the information processing apparatus 11A uses the space information including the accumulated data of the accumulation section 84 to generate virtual space image information. At this time, the context information regarding the point B may be used.

In step S223, the control section 83 of the information processing apparatus 11A determines whether or not this is the first generation of virtual space information. In step S223, in a case where the control section 83 determines that this is the first generation of virtual space information, the processing proceeds to step S224.

In step S224, the control section 83 of the information processing apparatus 11A causes the space information output from the output section 57 to be switched to the virtual space information and causes the virtual space information to be presented.

In other words, with the YES determination in the determination processing in step S219 used as the trigger 3, generation of virtual space image information is started in step S222. Additionally, with the YES determination in the determination processing in step S219 used as the trigger 3, the virtual space image information is presented in step S224. In the presentation in step S224, seamless switching is unnecessary.

In step S223, in a case where the control section 83 determines that this is not the first generation of virtual space information, the processing proceeds to step S225.

In step S225, the control section 83 of the information processing apparatus 11A causes the virtual space information output from the output section 57 to be updated and causes the updated virtual space information to be presented.

In step S226, the transmission section 101 of the information processing apparatus 11A transmits the space information regarding the point A to the information processing apparatus 11B.

The information processing apparatus 11B transmits the space information regarding the point B (step S259 described below). In step S227, the reception section 102 of the information processing apparatus 11A receives the space information regarding the point B that is transmitted from the information processing apparatus 11B.

In step S228, the control section 83 of the information processing apparatus 11A determines whether or not the space information regarding the point B has arrived.

In step S228, in a case where the control section 83 determines that the space information regarding the point B has not arrived, the space connection processing returns to step S221 to repeat the subsequent processing.

In step S228, in a case where the control section 83 determines that the space information regarding the point B has arrived, the processing proceeds to step S229. The YES determination in the determination processing in step S228 is the trigger 2 described above with reference to FIG. 10.

In step S229, the control section 83 of the information processing apparatus 11A causes the virtual space information output from the output section 57 to be switched to the space information regarding the point B and causes the space information regarding the point B to be presented. In other words, with the YES determination in the determination processing in step S228 used as the trigger 2, the virtual space information is faded out in step S229. This leads to seamless switching between the virtual space information and the space information regarding the point B.

After the processing in step S229, the space connection processing returns to step S212 to repeat the subsequent processing.

On the other hand, after the processing in step S254, the processing proceeds to step S255 in the information processing apparatus 11B. Processing in the subsequent steps S255 to S261 is basically similar to the processing in steps S55 to S61 in FIG. 11 and FIG. 12. Thus, the description of the steps is omitted to avoid repetitions.

As described above, in a case where the real-time transmission is stopped because the user has been out and then the user is approaching again, instead of display of nothing due to the lack of transmitted space information, the presentation of the virtual space information generated using the accumulated space information is performed.

This inhibits the user from having an uncomfortable feeling, and a sense of connection can be continuously provided.

In other words, for energy saving and bandwidth saving, even during the period of suspension of the real-time transmission before recovery of the connection, the present technique enables generation and presentation of images similar to images of current state of the communication destination to allow smooth transition to the current images. Accordingly, a sense of connection can be continuously provided.

Note that the above-described three operation examples illustrate examples in which the real-time transmission is stopped but that the real-time transmission may not necessarily be stopped unless the purpose of energy saving or bandwidth saving as described above needs to be satisfied.

4. CONCLUSION

As described above, in the present technique, even in a case where the real-time transmission is disabled, virtual space information corresponding to each location or terminal is generated and presented to each of the users having a sense of connection with a possible uncomfortable feeling minimized.

Additionally, in the present technique, in a case where the real space information is presented, the virtual space information is smoothly switched to the space information.

Accordingly, a sense of connection can be continuously provided with no uncomfortable feeling to the user.

Note that, with the present technique applied, space information including information absolutely needing to be prevented from being disclosed can be dealt with by generating and presenting dummy virtual space information.

Additionally, the examples of mutual transmission of the space information have been described above. However, mutual transmission of a difference in space information may be performed.

Furthermore, the examples have been described in which both space voice information and space image information are replaced with the virtual space information. However, an example can be provided in which, with only the virtual space image information presented, the actual space voice information is provided, or with the actual space image information presented, the virtual space voice information is presented.

The present technique is not limited to the real-time transmission and is also applied to time shift, recorded videos, or a unidirectional system.

5. OTHER

The above-described series of steps of processing of the server can be executed by hardware or by software. In a case where the series of processing is executed by software, a program included in the software is installed from a program recording medium into a computer incorporated in dedicated hardware or a general-purpose personal computer.

The program to be installed is provided by being recorded in a removable medium 61 driven by a drive 60 and including an optical disc (CD-ROM (Compact Disc-Read Only Memory), DVD (Digital Versatile Disc), or the like), a semiconductor memory, or the like. Additionally, the program may be provided via a wired or wireless transmission medium such as a local area network, the Internet, or digital broadcasting. The program can be pre-installed in the ROM 52 or the storage section 58.

Note that the program executed by the computer may be a program in which the steps of processing are chronologically executed in the order described herein or a program in which the steps of processing are executed in parallel or at necessary timings when, for example, invocation is performed.

Additionally, the system as used herein means a set of a plurality of components (apparatuses, modules (parts), or the like) regardless of whether or not all the components are located in the same housing. Accordingly, the system refers both to a plurality of apparatuses housed in separate housings and connected via a network and to one apparatus including a plurality of modules housed in one housing.

Note that the effects described herein are only illustrative and not restrictive and that other effects may be produced.

An embodiment of the present technique is not limited to the above-described embodiment, and various changes can be made without departing from the spirits of the present technique.

For example, the present technique can be configured in the form of cloud computing in which one function is shared among a plurality of apparatuses via a network and cooperatively processed.

Additionally, the respective steps described above with reference to the flowcharts can be executed by one apparatus or can be shared among a plurality of apparatuses and executed.

Furthermore, in a case where one step includes a plurality of steps of processing, the plurality of steps of processing can be executed by one apparatus or can be shared among a plurality of apparatuses and executed.

Examples of Combination of Configurations

The present technique can also be configured as follows.

(1)

A multi-direction communication apparatus including:

a reception section receiving real space information including information representing a situation of a real space for a first user;

a generation section generating, on the basis of the received real space information, virtual space information including information representing a situation of a virtual space; and a display control section controlling display, on an apparatus of a second user, of the virtual space represented by the generated virtual space information instead of the real space represented by the real space information.

(2)

The multi-direction communication apparatus according to (1) described above, in which the display control section controls display of the virtual space on the basis of sensing information including information representing a state of the second user.

(3)

The multi-direction communication apparatus according to (1) or (2) described above, in which in a case where presentation of the real space information has changed into an undesired state, the display control section controls display of the virtual space.

(4)

The multi-direction communication apparatus according to (1) or (2) described above, in which in a case where a state of a network is degraded, the display control section controls display of the virtual space when detecting degradation of image quality included in the real space information.

(5)

The multi-direction communication apparatus according to (1) or (2) described above, in which in a case where the second user is absent, the display control section controls display of the virtual space when detecting approach of the second user.

(6)

The multi-direction communication apparatus according to any of (1) to (5) described above, in which by fading out the real space represented by the real space information while smoothly switching to the generated virtual space information, the display control section controls display of the virtual space represented by the virtual space information.

(7)

The multi-direction communication apparatus according to (6) described above, in which in a case where the real space information is made available again, by fading out the virtual space information while smoothly switching to the real space information, the display control section controls display of the virtual space corresponding to the real space information.

(8)

The multi-direction communication apparatus according to (3) described above, in which in a case where presentation of the real space information has changed into the undesired state, the display control section controls display of the virtual space when the real space information is unavailable.

(9)

A multi-direction communication method including:

by a multi-direction communication apparatus, receiving real space information including information representing a situation of a real space for a first user;

generating, on the basis of the received real space information, virtual space information including information representing a situation of a virtual space; and controlling display, on an apparatus of a second user, of the virtual space represented by the generated virtual space information instead of the real space represented by the real space information.

(10)

A program causing a computer to function as:

a reception section receiving real space information including information representing a situation of a real space for a first user;

a generation section generating, on the basis of the received real space information, virtual space information including information representing a situation of a virtual space; and a display control section controlling display, on an apparatus of a second user, of the virtual space represented by the generated virtual space information instead of the real space represented by the real space information.

REFERENCE SIGNS LIST

1 Multi-direction communication system, 11, 11A to 11C Information processing apparatus, 12 Server, 13 Network, 51 CPU, 56 Input section, 57 Output section, 58 Storage section, 59 Communication section, 81 Context analysis section, 82 UI section, 83 Communication section, 84 Accumulation section, 85 Virtual data generation section, 101 Transmission section, 102 Reception section

The invention claimed is:

1. A multi-direction communication apparatus, comprising:

a reception section configured to receive real space information of a first space and context information of a first user associated with the first space, wherein the real space information includes at least one of date information of the first space, time information of the first space, location information of the first space, or environment information of the first space, and the context information includes a state of the first user in the first space;

a generation section configured to generate, based on each of the received real space information and the received context information, virtual space information that represents a situation of a virtual space; and a display control section configured to control display of the virtual space represented by the generated virtual space information, wherein the virtual space is displayed to a second user associated with a second space.

2. The multi-direction communication apparatus according to claim 1, wherein the display control section is further configured to control the display of the virtual space based on a state of the second user in the second space.

3. The multi-direction communication apparatus according to claim 1, wherein the display control section is further configured to:
control display of a real space represented by the received real space information; and
control the display of the virtual space based on an undesired state of the displayed real space, wherein the undesired state corresponds to a reduced resolution of the real space information.

4. The multi-direction communication apparatus according to claim 1, wherein the display control section is further configured to control the display of the virtual space based on degradation of a network.

5. The multi-direction communication apparatus according to claim 1, wherein the display control section is further configured to control the display of the virtual space based on detection of approach of the second user.

6. The multi-direction communication apparatus according to claim 1, wherein the display control section is further configured to switch to the display of the virtual space based on fade-out of a real space represented by the received real space information.

7. The multi-direction communication apparatus according to claim 6, wherein the display control section is further configured to control, after the display of the virtual space, display of the real space based on fade-out of the display of the space and availability of the real space information.

8. The multi-direction communication apparatus according to claim 3, wherein the display control section is further configured to control the display of the virtual space based on unavailability of the real space information.

9. A multi-direction communication method, comprising:
in a multi-direction communication apparatus:
receiving real space information of a first space and context information of a first user associated with the first space, wherein
the real space information includes at least one of date information, time information, location information, or environment information of the first space, and
the context information includes a state of the first user in the first space;
generating, based on each of the received real space information and the received context information, virtual space information that represents a situation of a virtual space; and
controlling display of the virtual space represented by the generated virtual space information, wherein the virtual space is displayed to a second user associated with a second space.

10. A non-transitory computer-readable medium having stored thereon, computer-executable instructions which, when executed by a processor, cause the processor to execute operations, the operations comprising:
receiving real space information of a first space and context information of a first user associated with the first space, wherein
the real space information includes at least one of date information, time information, location information, or environment information of the first space, and
the context information includes a state of the first user in the first space;
generating, based on the received real space information and the received context information, virtual space information that represents a situation of a virtual space; and
controlling display of the virtual space represented by the generated virtual space information, wherein the virtual space is displayed to a second user associated with a second space.

* * * * *